United States Patent [19]

Gibbons et al.

[11] Patent Number: 4,910,701

[45] Date of Patent: Mar. 20, 1990

[54] SPLIT ARRAY BINARY MULTIPLICATION

[75] Inventors: Jon C. Gibbons, San Jose; Simon Y. C. Lau, Milpitas; Marvin N. Fox, Sunnyvale, all of Calif.

[73] Assignee: Advanced Micro Devices, Sunnyvale, Calif.

[21] Appl. No.: 100,802

[22] Filed: Sep. 24, 1987

[51] Int. Cl.⁴ .............................................. G06F 7/52
[52] U.S. Cl. .................................................. 364/760
[58] Field of Search ............................. 364/757–760, 364/754

[56] References Cited

U.S. PATENT DOCUMENTS

| | | | |
|---|---|---|---|
| 3,866,030 | 2/1975 | Baugh et al. | 364/757 |
| 3,878,985 | 4/1975 | Ghest et al. | 364/759 |
| 4,153,938 | 5/1979 | Ghest et al. | 364/757 X |
| 4,228,520 | 10/1980 | Letteney et al. | 364/786 X |
| 4,441,158 | 4/1984 | Kanuma | 364/757 X |
| 4,646,257 | 2/1987 | Essig et al. | 364/760 |
| 4,748,582 | 5/1988 | New et al. | 364/757 X |

FOREIGN PATENT DOCUMENTS

| | | | |
|---|---|---|---|
| 228097 | 10/1985 | German Democratic Rep. | 364/757 |
| 2095008 | 9/1982 | United Kingdom | 364/754 |
| 2108736 | 5/1983 | United Kingdom | 364/754 |

OTHER PUBLICATIONS

Waser, S. and Peterson, A.; "Real-time Processing Gains Ground with Fast Digital Multiplier"; *Electronics*; vol. 50, No. 20; Sep. 29, 1977; pp. 93–99.

Thomas C. Bartee, "Digital Computer Fundamentals", Sixth Edition, McGraw Hill, New York, pp. 197-198, (1985).

"Introduction to Arithmetic for Digital Systems Designers" authored by Shlomo Waser, published by *CBS College Publishing*, Holt, Rinehart and Winston, 1982, see Chap. 4, p. 131, et seq.

*Monolithic Memories' Systems Design Handbook*, Second Edition, published in 1984, pp. 8-41 to 8-44.

1984 IEEE International Solid-State Circuits Conference publication at pp. 92–93, of the paper presented by Jun Iwamura et al., entitled "A CMOS/SOS Multiplier".

*Primary Examiner*—Eugene R. Laroche
*Assistant Examiner*—Benny Lee
*Attorney, Agent, or Firm*—Skjerven, Morrill, MacPherson, Franklin & Friel

[57] ABSTRACT

A system for binary multiplication based upon the modified Booth algorithm incorporating a Booth multiplex decoder, partial modified Booth arrays and partial product reduction adders. The system is comprised of Booth multiplexer cells, Booth multiplexer and adder cells, sign extension cells, and full adder cells interconnected such that the total adder delay through the system is n/4+1 adder delays where n is the number of bits in the multiplier.

17 Claims, 15 Drawing Sheets

8 X 8 SPLIT ARRAY BOOTH MULTIPLIER ARRAY

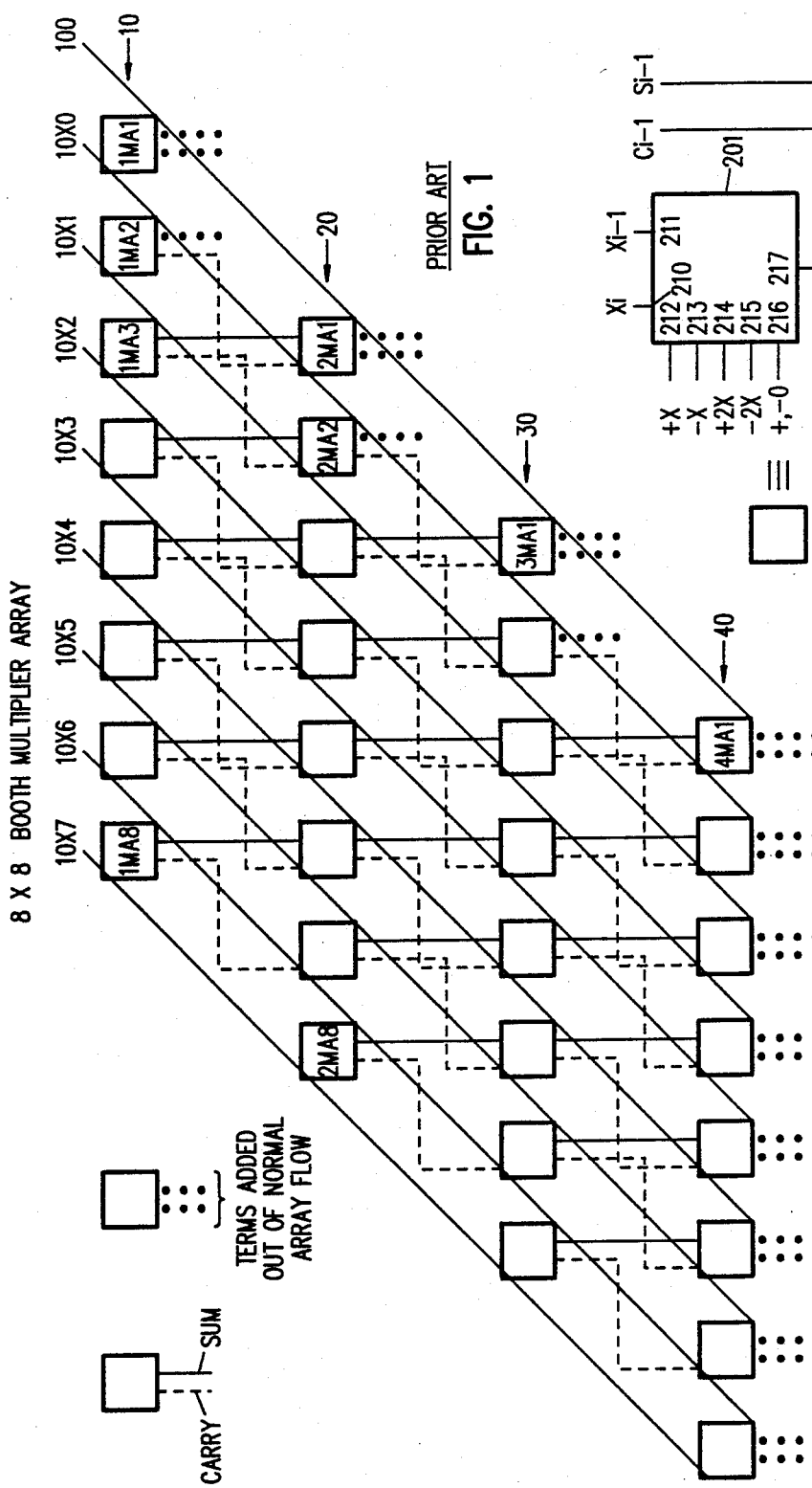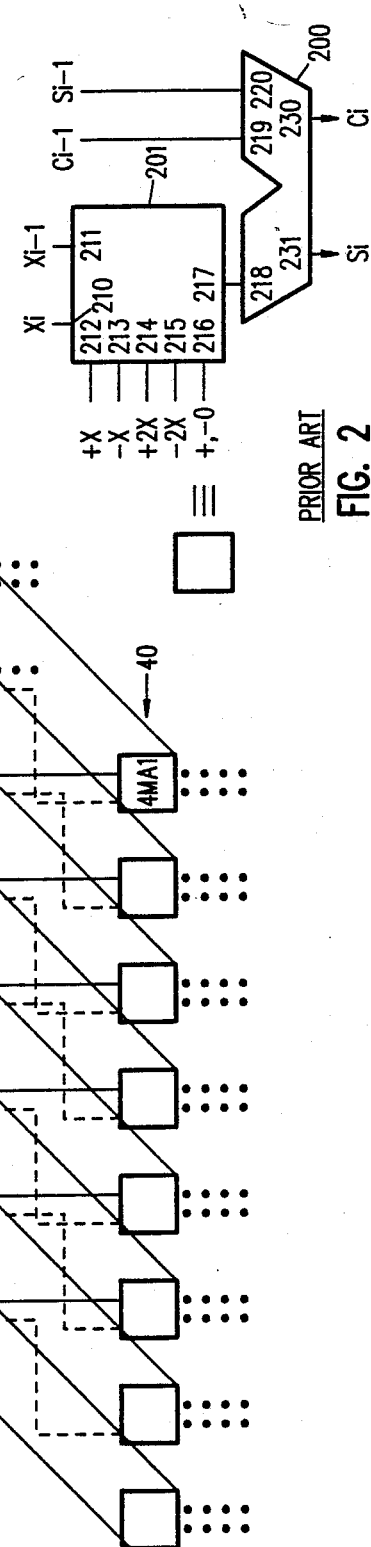
PRIOR ART
FIG. 1
PRIOR ART
FIG. 2

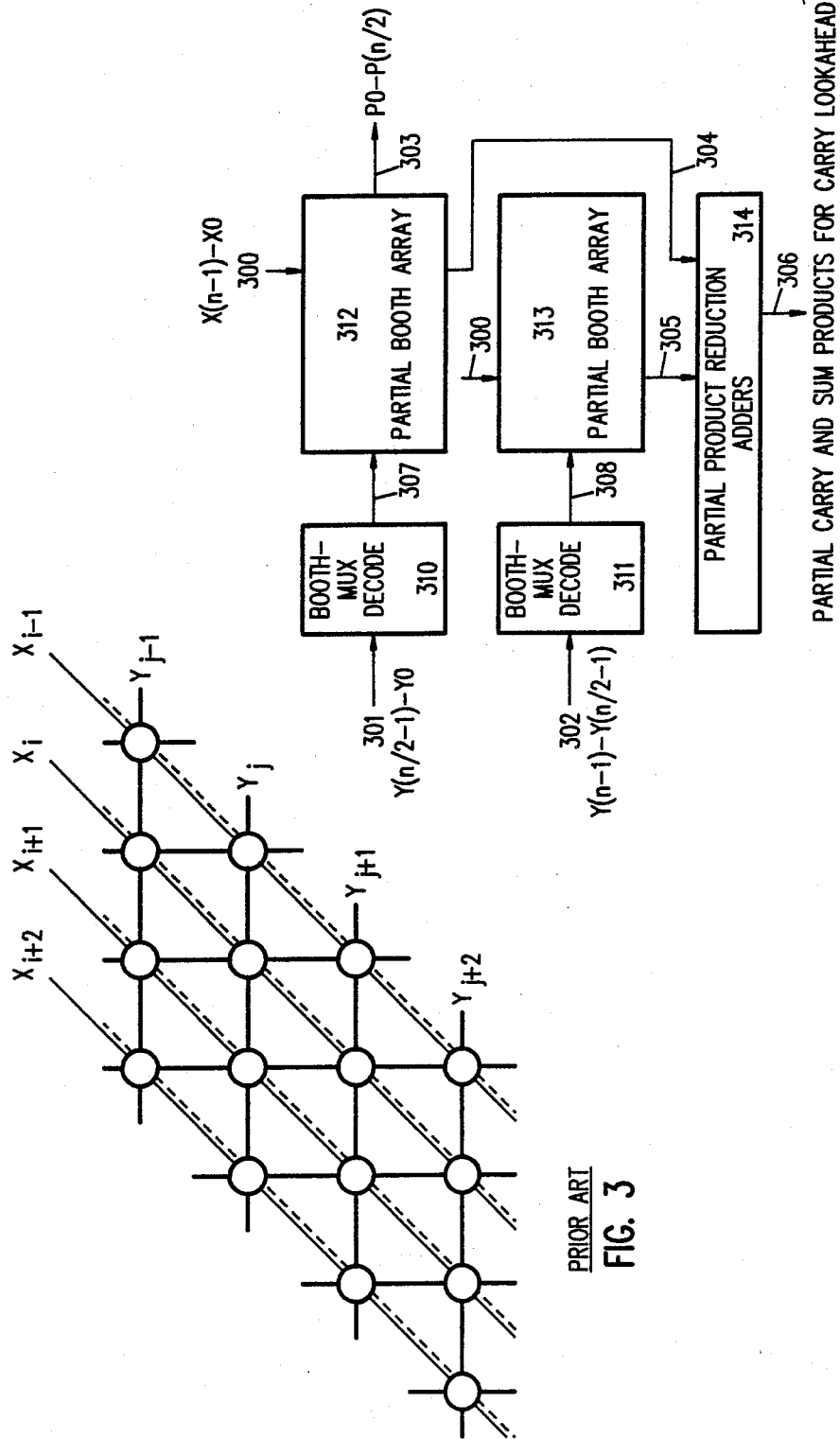

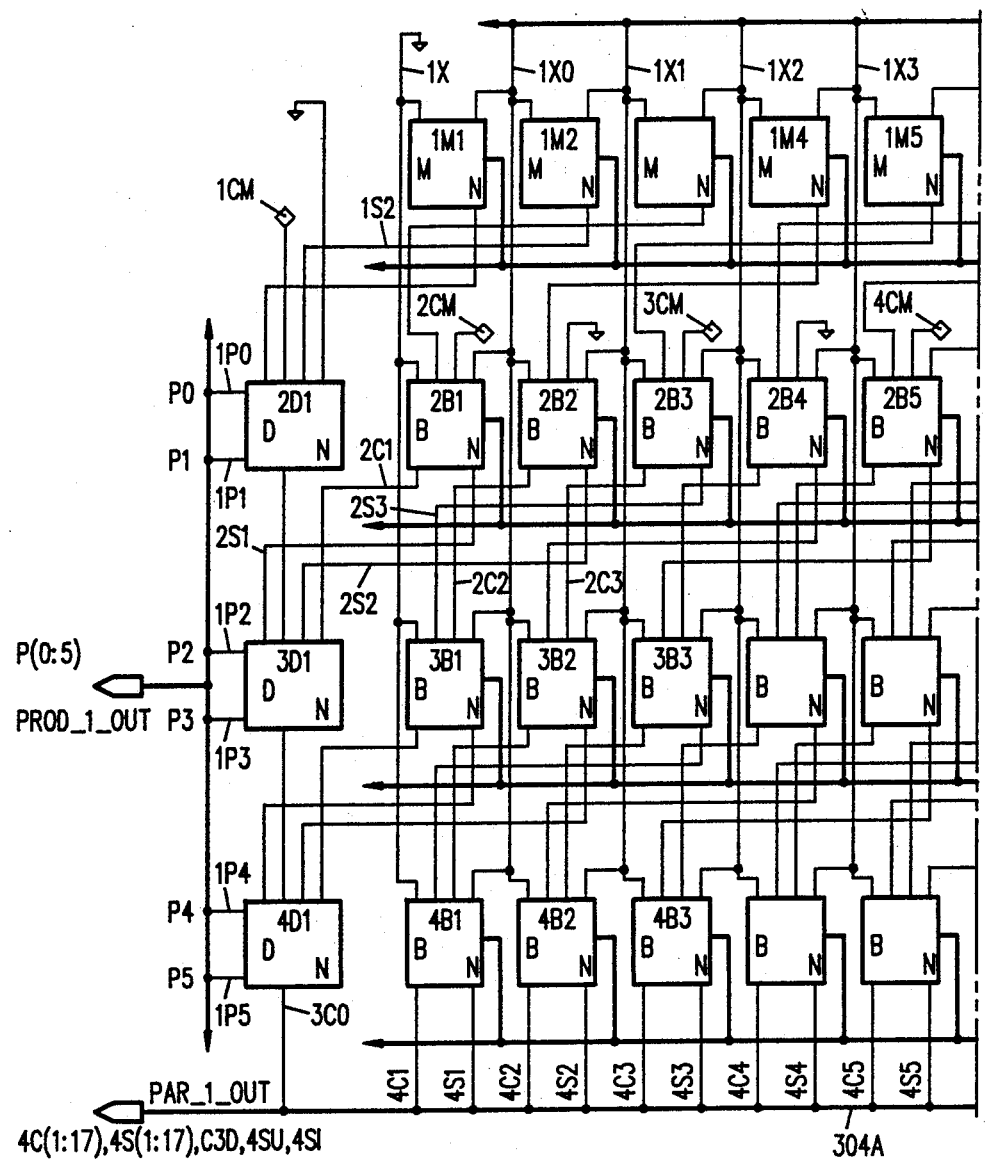
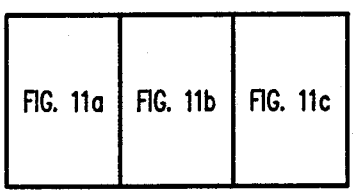
FIG. 11a

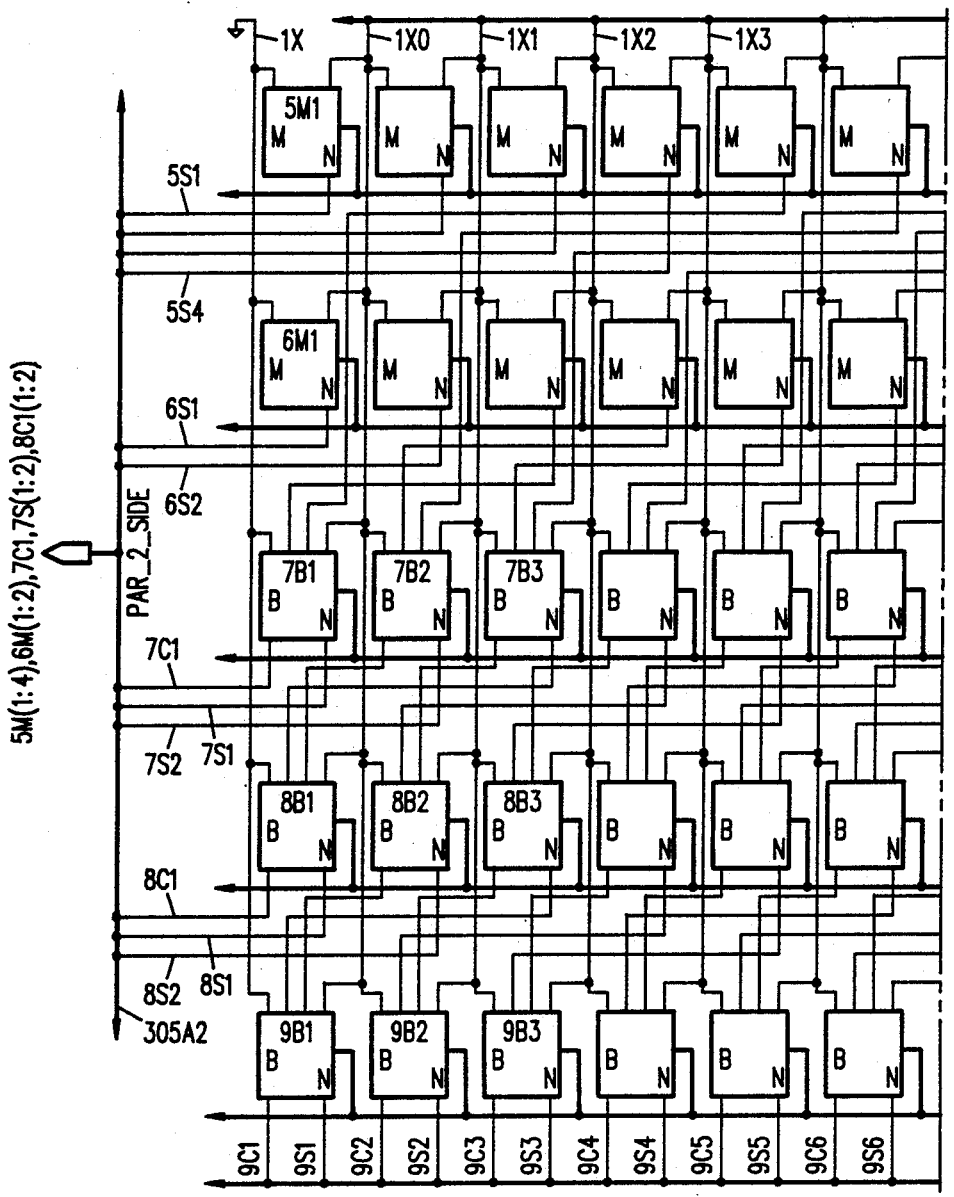
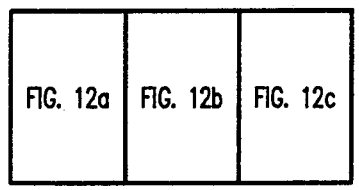
FIG. 12a
KEY TO FIG. 12

SPLIT ARRAY BINARY MULTIPLICATION

BACKGROUND OF THE INVENTION

1. Field of the Invention

This invention relates to digital signal processing systems employing binary multiplication and in particular to a binary multiplication means incorporating a modified Booth algorithm.

2. Description of the Prior Art

Binary multiplication is generally used in digital signal and data processing systems to perform high speed multiplication. The signal and data processing systems are presently formed with multiplier arrays on semiconductor or silicon chips preferably using CMOS technology. When operating a digital multiplier, along multiplication process is followed. For every digit in one of the factors (the multiplier) a multiple is formed of the other factor (the multiplicand) and is added to a running total (the partial product). If the whole operation is done simultaneously by fast multiplier, then one adder is needed for every digit in the multiplier.

The Booth algorithm is generally used to reduce by half the number of full adders required to perform a multiplication in an n x n bit array, having an x multiplicand of n bits and a y multiplier of n bits. Parallel binary multiplication implementing the Booth algorithm generates n partial products simultaneously and the partial products are added to form a final product of $2n$ bits.

The Booth algorithm is a procedure for multiplying two's complement numbers. However, the Booth algorithm does not present significant speed advantages. Therefore, the modified Booth algorithm is typically used in digital binary multiplication. With the modified Booth algorithm, to multiply using 2 bits of the multiplier at a time, it is necessary to look at 3 bits at a time, i.e., the current group of 2 bits and the most significant bit in the group which was looked at during the preceding cycle. Each multiplier is divided into substrings of 3 bits, with adjacent groups sharing a common bit. The modified Booth algorithm can be used with either unsigned or two's complement numbers, and requires that the multiplier be padded with a zero to the right of the least significant bit of the multiplier. When using the algorithm with unsigned numbers, it is necessary to pad the n bit multiplier with one or two zeroes to the left o the most significant bit.

The modified Booth algorithm generates n/2 independent partial products always. The modified Booth method produces four partial products from an 8-bit signed multiplier. The modified Booth technique uses $n/2-1$ adder delays for two's complement multiplication. When unsigned multiplication is performed with the modified Booth algorithm, an extra row of adders is needed for the one bit increase in precision, resulting in $n/2$ adder delays.

The following table illustrates the use of the modified Booth algorithm, wherein three multiplier bits are encoded:

TABLE I

| Bit $2^1$ $Y_i+1$ | $2^0$ $Y_i$ | $2^{-1}$ $Y_i-1$ | Operation | |
|---|---|---|---|---|
| 0 | 0 | 0 | add zero (no string) | +0 |
| 0 | 0 | 1 | add multiplicand (end of string) | +X |
| 0 | 1 | 0 | add multiplicand (a string) | +X |
| 0 | 1 | 1 | add twice the multiplicand (end of string) | +2X |
| 1 | 0 | 0 | subtract twice the multiplicand (beginning of string) | −2X |
| 1 | 0 | 1 | subtract the multiplicand (−2X and +X) | −X |
| 1 | 1 | 0 | subtract the multiplicand (beginning of string) | −X |
| 1 | 1 | 1 | subtract zero (center of string) | −0 |

A detailed explanation of binary multiplication and the operation of the modified Booth algorithm is presented in the textbook entitled "Introduction to Arithmetic for Digital Systems Designers", authored by Shlomo Waser, published by CBS College Publishing, Holt, Rinehart and Winston, 1982, see chapter 4, page 131, et seq. A further description of the operation of binary multipliers employing the Booth algorithm is provided in *Monolithic Memories' Systems Design Handbook*, Second Edition, published in 1984, pages 8-41 to 8-44.

A prior art modified Booth multiplier array for an 8-bit signed multiplier and an 8-bit signed multiplicand is illustrated in FIG. 1. The modified Booth multiplier array is comprised of four rows 10, 20, 30, 40 of Booth multiplexer and full adder cells. Each Booth multiplexer and full adder, a cell of the array, is represented by a box in FIG. 1. For example, the Booth multiplexer and adder cells 1MA1-1MA8 comprise the first row 10 of the array. The line 100 is connected to the Booth multiplexer and adder cells 1MA1, 2MA1, 3MA1, 4MA1. The line 10X0 is connected to the Booth multiplexer and full adder cells 1MA1, 1MA2, 2MA1, 2MA2, 3MA1, 3MA2, 4MA1, and 4MA2. The remaining lines 10X1-10X7 are connected to the cells in a manner similar to that described for the line 10X0. The dashed lines in FIG. 1 represent the lines which have the carry signal from the full adder in each cell, while the solid lines represent the lines which have the sum signal from the full adder in each cell. The dotted lines represent the lines which have the sum and carry signals that are processed to form the bits of the product. Typically, the dotted lines are connected to a carry look ahead adder which performs the combinations necessary to define the final bits in the product. The control lines to the multiplexer in each cell of the array are not shown in FIG. 1 for clarity.

The Booth multiplexer and full adder cell in FIG. 1 is shown in more detail in FIG. 2. Each cell is comprised of a Booth multiplexer 201 and a full adder 200. The multiplexer 201 has seven input terminals 210-216. The terminal 210 is a first data input terminal and a line which provides the $x_i$ bit of the multiplicand is typically connected to it. The terminal 211 is a second data input terminal and a line which carries the $x_{i-1}$ bit of the multiplicand is connected to it. The terminals 212-216 are input terminals for the multiplexer control lines. The output terminal 217 of the multiplexer 201 is connected to a first input terminal 218 of the full adder 200. The full adder has two additional input terminals 219, 220.

The line connected to the terminal 219 provides a carry signal from a full adder in the previous row of the array, and so this terminal is called the "carry in" terminal. Similarly, the line connected to the terminal 220 provides a sum signal from a full adder in the previous row of the array, and so this terminal 220 is called the "sum in" terminal. A first output terminal 230 of the full adder 200 supplies the carry signal from the full adder 200 and a second output terminal 231 provides the sum signal. The terminal 230 will be referred to as the "carry out" terminal and the terminal 231 as the "sum out" terminal.

For the modified Booth algorithm in Table I, the control lines connected to the terminals 212-216 of the multiplexer 201 carry signals which correspond to the five possible results given in the last column of the table. Based upon he signals on the control lines, the multiplexer 201 will perform the correct operation on either the input signal corresponding to the $x_i$ bit of the multiplicand on the terminal 210 or the input signal corresponding to the $x_{i-1}$ bit of the multiplicand on the terminal 211, and provide the resulting signal to the output terminal 217.

Another approach to binary multiplication employs a carry save technique, wherein a carry digit is produced as a result of an arithmetic operation on one digit place of two or more numbers when the sum of the two digits in the same digit place equals or exceeds the base of the number system in use. The resultant of the summation is transferred or carried over to the next higher digit place. For n bit operands the carry save technique requires $n-1$ adder delays in the array section of the multiplier.

A partial segment of a carry save multiplier array is shown in FIG. 3. Each of the circles in FIG. 3 represents a full adder with a logical AND gate. The dotted lines represent the carry signals from the adder while the solid lines are the sum signals.

A modified array technique of binary multiplication employs the carry save array wherein the sum and carry products skip every alternate row. The skip a row method increases the parallelism of the array and decreases the total number of adder delays to $n/2+1$. The array consists of odd rows and even rows. Sum and carry signals generated by an odd row are transferred to the nex odd row, and the carry signals generated by an even row are concurrently transferred to the next even row. Two pairs of sum and carry signal streams are formed in the array in parallel. Thereafter, the sums of the odd and even rows are added to produce a final product. In this way, the modified array reduces the number of addition stages by approximately one half that of the conventional carry save adder method. The technique is described in the 1984 IEEE International Solid-State Circuits Conference publication at pages 92-93, of the paper presented by Jun Iwamura et al., entitled "A CMOS/SOS Multilier".

The skip a row multiplier array could be implemented so as to use the modified Booth algorithm. However, the skip a row modified Booth multiplier array loses many of the advantages of the modified Booth multiplier array as shown in FIG. 1. For an nxn array, the first $n/2-2$ rows have seven un-added output terms and the last two rows have all the output terms un-added. Thus, the formation of the final sum and carry outputs requires considerable reduction. In addition, the seven un-added terms in the first $n/2-2$ rows do not easily combine in the minimum number of adder delays to provide the least significant bits of the product. The physical implementation is complex because straightening out the array requires each sum term to skip a row of adders and shift over four places while each carry term must skip a row of adders and shift over three places.

Thus, the prior art teaches either a uniform modified Booth array with $n/2$ adder delays, or a skip a row modified Booth array, which is complex and requires considerable signal reduction, with some improvement in speed. The present invention maintains the advantages of the modified Booth array, uniform physical implementation and easy reduction of the least significant bits of the product, and provides a significant increase in performance.

SUMMARY OF THE INVENTION

An object of this invention is to provide high speed binary multiplication with a reduction of adder delays in a signal and data processing system.

Another object of the invention is to reduce the adder delays of modified Booth binary multiplication while maintaining both the uniformity of the modified Booth multiplication circuit array and the ease of producing the least significant $n/2$ bits of the product.

Another object is to increase the parallelism of a modified Booth algorithm binary multiplication circuit thereby enhancing the binary multiplication function.

In accordance with this invention, the modified Booth array performs both signed and unsigned binary multiplication without incurring the additional adder delay normally associated with unsigned binary multiplication. The parallelism of the modified Booth algorithm binary multiplication circuit is increased by splitting the modified Booth array into two equal portions.

The upper portion of the array processes the least significant $n/2-1$ bits of the modified Booth encoded multiplier The upper half of the array comprises one row of Booth multiplexers plus $n/4-1$ rows of adder cells. The lower portion of the array processes the most significant $n/2$ bits of the modified Booth encoded multiplier. The lower half of the array comprises one or two rows of Booth multiplexers plus $n/4-1$ rows of Booth multiplier and full adders.

The two array portions process data simultaneously, as each array portion has independent inputs. Each array portion generates its own partial sum and carry products in $n/4-1$ adder full delays plus one Booth multiplexer delay. The final partial products are reduced by two rows of full adders before entering the connected carry look-ahead. The total time delay through the full array is $n/4+1$ adder delays plus one Booth multiplexer delay.

BRIEF DESCRIPTION OF THE DRAWINGS

The invention will be described in greater detail with reference to the drawings in which:

FIG. 1 is a block diagram illustrating a prior art multiplier array utilizing the modified Booth algorithm;

FIG. 2 is a typical cell in a prior art multiplier array utilizing the modified Booth algorithm.

FIG. 3 is a representation of a carry save adder, as implemented in the prior art;

FIG. 4 is a block diagram of a binary multiplication system incorporating partial modified Booth arrays and a partial product reduction, in accordance with this invention;

DETAILED DESCRIPTION

Figure 5:
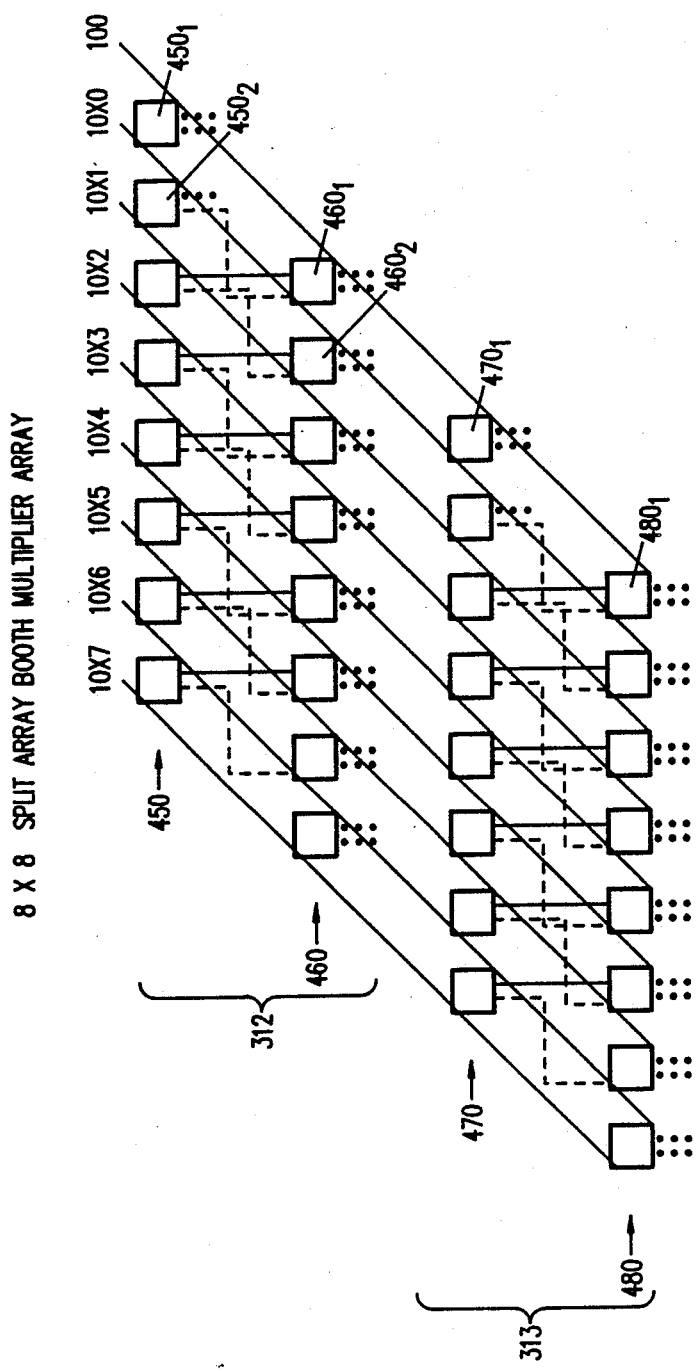
FIG. 5 is a block diagram of a modified Booth multiplier array in accordance with this invention.

The split array modified Booth multiplier of this invention has two basic inputs. The first input, the multiplicand, x, is an n bit number comprised of bits $x_0-x_{n-1}$. The second input, the multiplier, y, is also an n bit number comprised of bits $y_0-y_{n-1}$. While this invention is described in terms of a n bit multiplier and a n bit multiplicand, the invention is easily implemented for the more general multiplication of a n bit multiplier and a m bit multiplicand. The output signals from the split array multiplier are partial products which are equivalent to the outputs obtained from a normal modified Booth array as depicted in FIG. 1. A block diagram of the novel array architecture of this invention for performing binary multiplication using the modified Booth algorithm is illustrated in FIG. 4.

The line 300 is comprised of n+2 input lines. The input line 301 comprises n/2+1 lines. The line 302 is comprised of n/2+2 lines. The line 301 is input into a Booth multiplex decoder 310 and the line 302 is input to a Booth multiplex decoder 311. The output line 307 from the decoder 310 is connected to the upper partial modified Booth array 312. The number of lines comprising the line 307 depends upon the implementation of the modified Booth algorithm in the Booth multiplex decoder and is described further below. The line 308, which is similar to the line 307, connects the decoder 311 to the lower partial modified Booth array 313. The upper partial modified Booth array is comprised of one row of multiplexers and n/4−1 row of Booth multiplexer and full adder cells. The upper partial modified Booth array 312 has two output lines 303, 304 as shown in FIG. 4. The line 303 is comprised of n/2+1 lines and provides the output signals which correspond to the least significant bits of the product $P_0$-$P_{n/2}$. The line 304 represents the output lines from the upper partial modified Booth array 312 which are connected to the partial product reduction adders 314.

The input line 300 is also connected to the lower partial modified Booth array 313. If the multiplier array is an 8×8 array the lower partial modified Booth array is comprised of one row of multiplexers and n/4−1 rows of Booth multiplexer and full adder cells. However, if the multiplier is a 8 bit unsigned binary number or greater, the lower partial modified Booth array is comprised of two row of multiplexers and n/4−1 rows of Booth multiplexer and full adder cells. The line 305 which connects the lower partial modified Booth array to the partial product reduction adders 314 comprises the output lines from the lower partial modified Booth array 313. The output line 306 from the partial product reduction adders 314 represents the output lines from the two rows of adders comprising the partial product reduction adders.

The modified Booth multiplier array of this invention performs both signed and unsigned binary multiplication without incurring the additional adder delay normally associated with unsigned binary multiplication. Therefore, unless otherwise noted, the modified Booth multiplier array of this invention functions in both modes.

The first input line of the n+2 lines comprising the line 300 provides the logical zero to the right of the least significant bit of the multiplicand required for the modified Booth algorithm. The second input line carries the signal corresponding to the first bit in the multiplicand, $x_0$, where $x_0$ is the least significant bit of the multiplicand, and the second through n+1 lines comprising the line 300 carry the signals corresponding to the $x_1$ to the $x_{n-1}$ bits of the multiplicand respectfully. The last line comprising line 300 carries the signal corresponding to the sign bit of the multiplicand.

The first line of the n/2+1 lines comprising the line 301 provides the logical zero of the right of the least significant bit of the multiplier required for the modified Booth algorithm. The second line carries the signal corresponding to the least significant bit of the multiplier, $y_0$, and each subsequent line carries the signal corresponding to the next bit in the multiplier. The first line of the n/2+2 lines comprising the line 302 carries the signal corresponding to the $y_{n/2-1}$ bit of the multiplier and each subsequent line carries the signal corresponding to a higher order bit of the multiplier. The last line comprising the line 302 carries signals which relate to the sign of the multiplier.

The function performed by the decoders 310 and 311 will depend upon the particular encoding of the modified Booth algorithm being implemented. For the algorithm in Table I, the decoder groups the input signals which correspond to the bits of the multiplier into the appropriate 3-bit segments. For each 3-bit segment, an output signal which corresponds to the modified Booth algorithm operation for the 3-bit segment is provided to the appropriate row of the multiplier array as described below.

The layout for the 8×8 partial modified Booth multiplier arrays 312, 313 is shown conceptually in FIG. 5. The basic structure is similar to the layout of the prior art modified Booth array illustrated in FIG. 1. In FIG. 5, each row of the array is represented by a number, e.g., row 1 is denoted by 450. Each cell within the row is denoted by the row number and a subscript. For example, the first cell in the first row 450 in cell $450_1$; the first cell in the second row 460 is cell $460_1$; the first cell in the third row 470 is cell $470_1$; and the first cell in the fourth row 480 is cell $480_1$. There are four rows 450, 460, 470, 480 of cells, but the second row of cells 460 is no longer connected to the third row of cells 470. Rather the output signals from the second row are now combined with the other output signals in the partial product reduction adder 314 as illustrated in FIG. 4.

Since the sum and carry signals from the cells in the row 460 (FIG. 5) no longer provided to the cells in row 470, the cells in row 470 do not have to add these terms to the signal from the Booth multiplexer as in the third row of the prior art array. Therefore, the full adder may be eliminated from the cells in the row 470. Hereinafter, the terms "full adder" and "adder" are both used to denote a full adder. Similarly, the first row 450 is a row of multiplexers. The array shown in FIG. 5 does not permit unsigned multiplication for an 8-bit number.

Thus, both the upper and lower portions of the array are comprised of a row of Booth multiplexers and a row of Booth multiplexer and full adder cells. Since the upper and lower portions operate simultaneously, the delay time through the array is one full adder delay plus one multiplexer delay. This delay plus the two full adder delays of the partial product reduction adders gives a total delay time for the structure of this invention of three full adder delays plus one multiplexer delay.

Further, the output terms in the cells $450_1$, $450_2$, $460_1$, $460_1$. and the first output term of the cell $460_2$ are identical to those of the prior art array in FIG. 1. Accordingly, unlike the every-other row modified Booth multiplier array, the least significant bits of the product are obtained from the array of this invention in a manner similar to that of the prior art.

The architecture of the modified Booth multiplier array in FIG. 5 maintains the advantages of the prior art. The least significant bits of the products are available in a manner similar to the prior art array. The layout is also similar to that in the prior art. Hence, the uniformity and the ease of implementation are maintained while the number of adder delays of the array is reduced.

The split array modified Booth multiplier of this invention has been implemented for $16 \times 16$ bit multiplication of both signed and unsigned numbers. The first step in the implementation was to reduce the number of control lines to the multiplexer 201 in FIG. 2 from five lines to three lines.

The modified Booth algorithm, as shown in Table I, has five different operations that must be performed depending on the bit pattern of the multiplier. The multiplexer 201 in FIG. 2 simply has one control line for each of the five operations. However, as shown in Table II, the five different operations can be uniquely defined by the application of varying combinations of signals on three lines. The first three columns in Table II are possible combinations of three bits in the multiplier. The last column in Table II is the modified Booth algorithm operation corresponding to the bit pattern of the multiplier in that row. These columns are identical to the corresponding columns in Table I. However, the columns labeled CM, C1X, and C2X in Table II illustrate the definition of three signals which uniquely correspond to both the bit pattern and the modified Booth algorithm operation in the same row of the table.

Figure 6A:
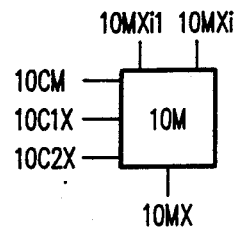
FIG. 6a is a block diagram of a Booth multiplexer in accordance with this invention.
Figure 6B:
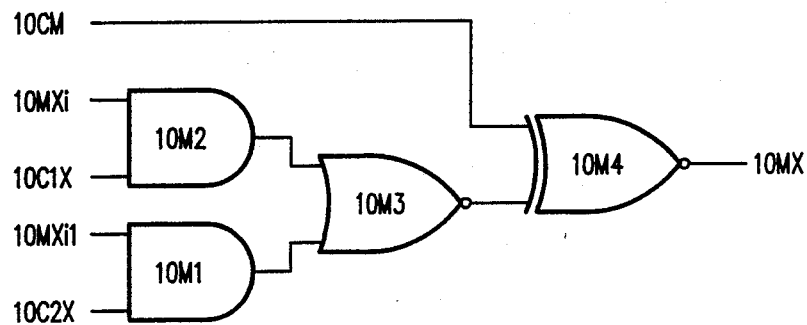
FIG. 6b is a schematic diagram of a Booth multiplexer in accordance with this invention.

As shown in FIG. 6a, the Booth multiplexer 10M of this invention has a first input terminal 10MXil and a second input terminal 10MXi, three control line input terminals 10CM, 10C1X, 10C2X and one output terminal 10MX. FIG. 6b illustrates the logic circuit comprising the Booth multiplexer 10M. The first input terminal 10MXil is connected to a first input terminal of a first AND gate 10M1. The control line input terminal 10C2X is connected to a second input terminal of the AND gate 10M1. The second input terminal 10MXi is connected to a first input terminal of a second AND gate 10M2. The control line input terminal C1X is connected to the second input terminal of the AND gate 10M2.

The output terminal of the AND gate 10M1 is connected to a first input terminal of NOR gate 10M3. The output terminal of the AND gate 10M2 is connected to a second input terminal of NOR gate 10M3. The output terminal of the NOR gate 10M3 is connected to a first input terminal of the Exclusive NOR gate 10M4. The control line input terminal 10CM is connected to a second input terminal of the Exclusive NOR gate 10M4. The output terminal of the Exclusive NOR gate 10M4 is the output terminal 10MX of the multiplexer 10M.

In the present invention, a signal corresponding to the $X_{i-1}$ bit of the multiplicand is applied to the first input terminal 10MXil of the Booth multiplexer 10M and a signal corresponding to the $X_i$ bit of the multiplicand is applied to the second input terminal 10MXi. The columns labeled CM, C1X, and C2X in Table II correspond to the signal levels on the three control line input terminals 10CM, 10C1X, 10C2X of the Booth multiplexer 10M in FIG. 6.

For example, if the 3-bit segment of the multiplier is 0,0,1 then the modified Booth algorithm requires that the $+x$ operation be performed on the input signal to the Booth multiplexers in the row of the multiplier array corresponding to this three bit segment of the multiplier. The $+x$ operation is performed by the Booth multiplexer 10M when the control line input terminal 10CM has a zero signal level, the control line input terminal 10C1X has a one signal level and the control line input terminal 10C2X has a zero signal level as shown in Table II. For this combination on control signals, the output signal from the circuit in FIG. 6b is the signal applied to the second input terminal, i.e. $+X_i$, as required by the modified Booth algorithm.

The output signal of the Booth multiplexer 10M for the various combinations of signals on the control lines CM, C1X, C2X is shown in the column labeled "Mux Output" of Table II. The results in the "Mux Output" column assume that the signal corresponding to the $x_{i-1}$ bit of the multiplicand is on the first data input terminal and the signal corresponding to the $x_i$ bit is on the second data input terminal of the Booth multiplexer 10M.

Figure 11B:
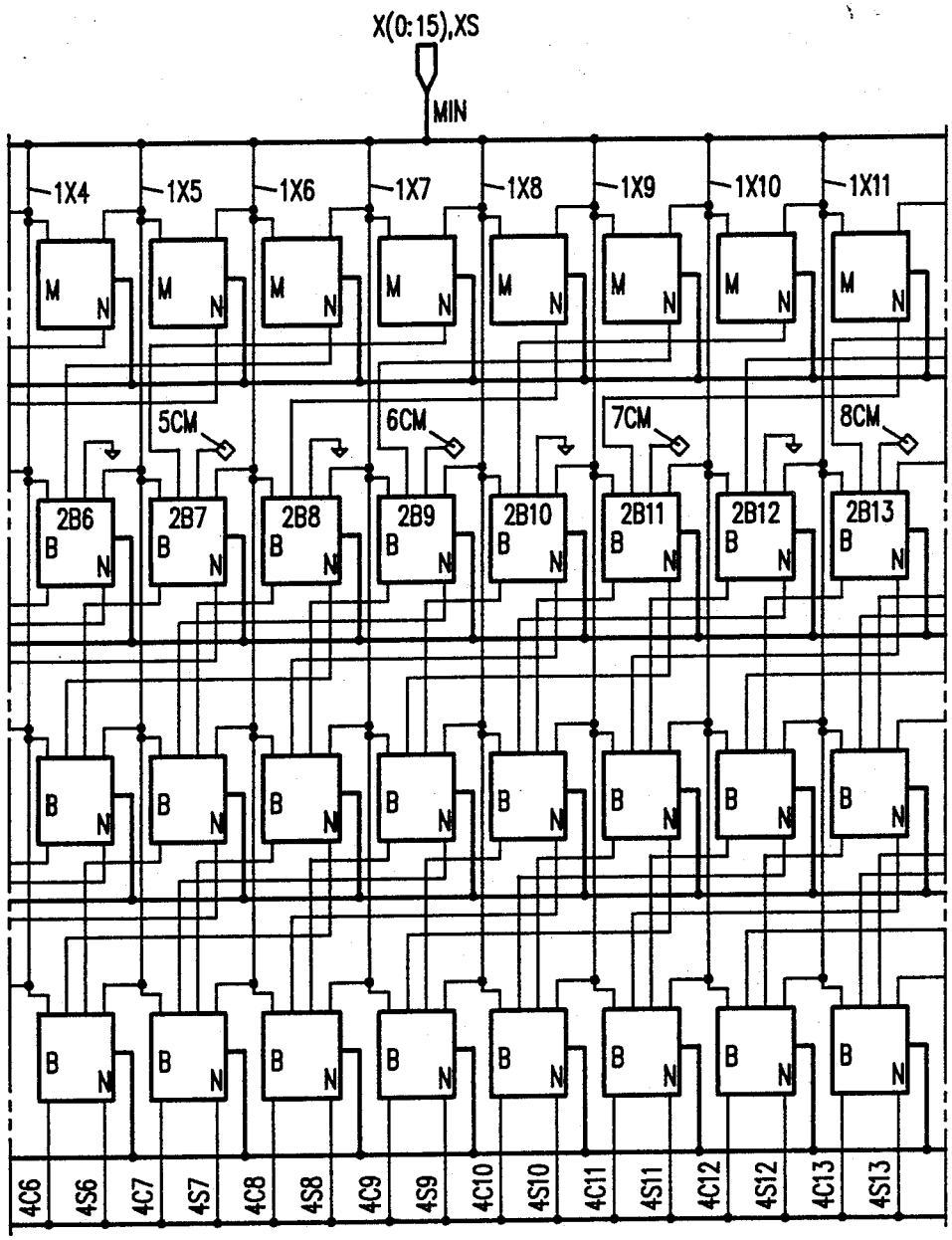
FIG. 11 is a schematic diagram of the upper portion of the split array modified Booth multiplier in accordance with this invention.
Figure 11C:
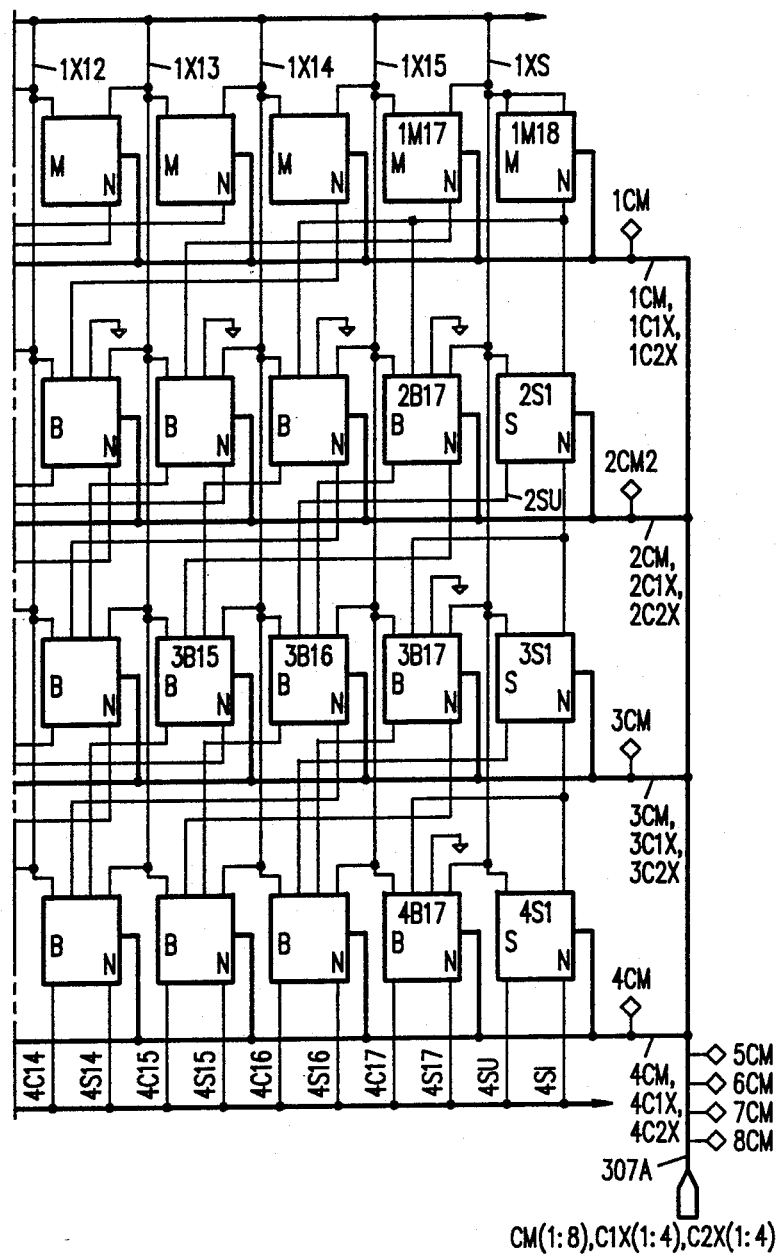

Table II also shows how the modified Booth operation is implemented. For example, the 2x operation is simply a one-bit left shift of the multiplicand. Subtraction is implemented by passing the complement of the multiplicand and injecting a one at appropriate points in the multiplier array. The signal on the line CM is used to inject the one signal into the proper bit position of the array as is shown in FIG. 11. With the combination of input signals, control line signals and output signals in Table II the Booth multiplexer of this invention is completely defined.

TABLE II

| Booth Mux Decode and Operation | | | | | | | |
|---|---|---|---|---|---|---|---|
| Yi + 1 | Yi | Yi − 1 | CM | C1X | C2X | mux Output | Operation |
| 0 | 0 | 0 | 0 | 0 | 0 | 0 | +0 |
| 0 | 0 | 1 | 0 | 1 | 0 | $X_i$ | +X |
| 0 | 1 | 0 | 0 | 1 | 0 | $X_i$ | +x |
| 0 | 1 | 1 | 0 | 0 | 1 | $X_{i-}$ | +2X |
| 1 | 0 | 0 | 1 | 0 | 1 | X | −2X |

TABLE II-continued

Booth Mux Decode and Operation

| Yi + 1 | Yi | Yi − 1 | CM | C1X | C2X | mux Output | Operation |
|---|---|---|---|---|---|---|---|
| 1 | 0 | 1 | 1 | 1 | 0 | $\overline{X}$ | −X |
| 1 | 1 | 0 | 1 | 1 | 0 | $\overline{X}$ | −X |
| 1 | 1 | 1 | 0 | 0 | 0 | 0 | −0 |

Figure 7:
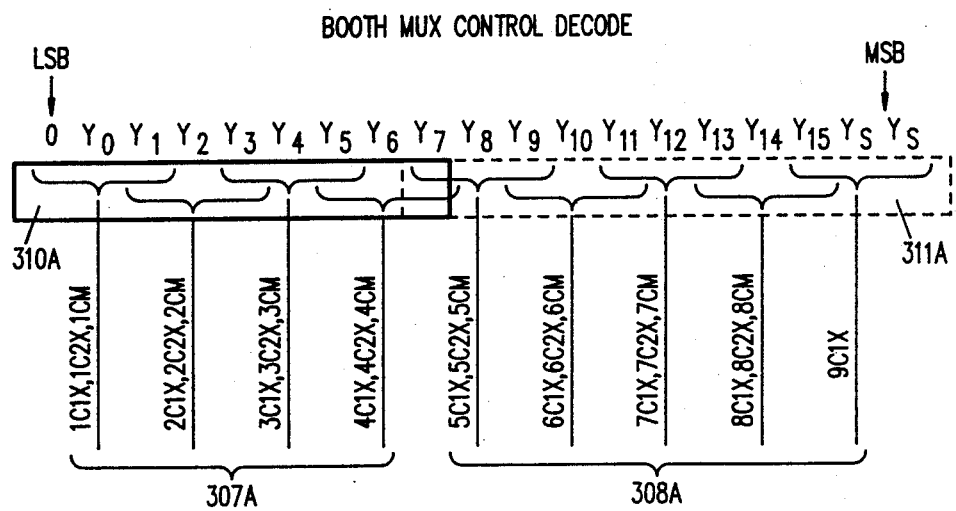
FIG. 7 illustrates the input signals and the output line groupings of the Booth multiplex decoder in accordance with this invention.

With Table II, the operation of the Booth multiplex decoders 310, 311 in FIG. 4 is easily understood. As shown in FIG. 7, the multiplier, Y, is a 16-bit number with the individual bits represented by $y_0 - y_{15}$ where $y_0$ is the least significant bit of the multiplier, Y. To implement the modified Booth algorithm, a zero is added to the left of the bit $y_0$ and two additional bits shown as $y_s$ are added for the sign representation. The bits 0, $y_0$ and $y_1$ form a first set of three multipler bits; the bits $y_1$, $y_2$ and $y_3$ a second set; the bits $y_5$, $y_6$ and set; the bits $y_3$, $y_4$ and $y_5$ a third set; the $y_7$ a fourth set; the bits $y_7$, $y_8$ and $y_9$ a fifth bits $y_9$, $y_{10}$ and $y_{11}$ a sixth set; the bits $y_{11}$, $y_{12}$ and $y_{13}$ a seventh set; the bits $y_{13}$, $y_{14}$ and $y_{15}$ an eighth set; and the set $y_{15}$, $y_s$ and $y_s$ form a ninth set The Booth multiplex decoder 310A has eight input lines corresponding to the lines which carry the signals for the bits 0 through $y_7$, while the second Booth multiplex decoder 311A has eleven input lines which carry the signals corresponding to the bits $y_7$ through $y_s$. Output lines 307A from the Booth multiplex decoder 310A in FIG. 7 comprise four sets of three lines each. The first set of three lines 1CM, 1C1X, 1C2X from the Booth multiplex decoder 310A carry the signals shown in columns CM, C1X, C2X respectively in Table II for the bit pattern represented by the bits 0, $y_0$, $y_1$. Similarly, the other three sets of three lines 2CM, 2C1X, 2C2X; 3CM, 3C1X, 3C2X; 4CM, 4C1X, 4C2X carry the appropriate signals as shown in Table II under the CM, C1X, C2X columns for the second, third and fourth groups of bit patterns respectively. FIG. 7 illustrates the grouping of multiplier bit signals and tee corresponding set of output lines from the Booth multiplex decoder for each set of bits of the multiplier.

Output lines 308A from the Booth multiplex decoder 311A in FIG. 7 comprise four sets of three lines each plus a fifth set with one line. In FIG. 7, the input lines to the Booth multiplex decoder 311A are represented by the symbols $y_7-y_s$. The overlap in the Booth multiplex decoders 310A, 311A in FIG. 7 shows that the line $y_7$ is input to both of the decoders. The corresponding four sets of three lines are represented by a single line with the individual line's number on the line. The first set of three lines 5CM, 5C1X, 5C2X, from Booth multiplex decoder 311A carry the signals shown in columns CM, C1X, C2X, respectively, in Table 2 for the bit pattern represented by the bits $y_7$, $y_8$, $y_9$. Similarly, the three sets of three lines 6CM, 6C1X, 6C2X, 7CM, 7C1X, 7C2X; 8CM, 8C1X, 8C2X and the fifth set with line 9C1X carry the appropriate signals as shown in Table 2 under the CM, C1X, C2X, columns for the second, third, fourth and fifth groups of bit patterns, respectively, to decoder 311A. The signals on the lines are defined using Table II as described for the decoder 310A.

The remaining output line 9C1X from the Booth multiplex decoder 311A must be defined. This requires a definition of the sign bit. The sign bit for the 16×16 array is defined as:

$$y_s = y_m \cdot y_{15}$$

where
$y_m = 1$ for two's complement and
$y_m = 0$ for unsigned binary.

With this definition of $y_s$, the possible combinations for the ninth set of multiplier bits are 000, 111, or 001. From Table II, the only possible operations for these bit patterns in the modified Booth algorithm are either a zero addition or a +X addition. Thus, three control lines from the Booth multiplex decoder to the multiplexers in the ninth row of the array are not needed. Rather, the terminals 10CM and 10C2X, as shown in FIG. 6, are grounded, i.e. set to a logical zero, on each multiplexer in the ninth row of the multiplier array. Then, if signals in the column ) C1X are applied to the multiplexer in the ninth row the appropriate operation will be performed. Therefore the ninth set of lines from the decoder 311A is only the single line 9C1X.

Figure 8A:
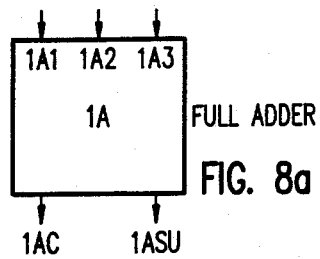
FIGS. 8a-8g illustrates block diagrams of the cells used to build a split array modified Booth multiplier in accordance with this invention.

To build the partial modified Booth arrays 312, 313 in FIG. 4, for the 16×16 split array modified Booth multiplier several different cells are required. The cells are shown as block diagrams in FIGS. 8a-8g. The block diagram for the full adder cell 1A is illustrated in FIG. 8a. The adder 1A has three input terminals 1A1, 1A2, 1A3. A signal corresponding to the sum of the signals on the lines attached to the input terminals 1A1, 1A2, 1A3 is provided on the sum output terminal 1ASU. If the summation generates a carry, this signal is on the carry output terminal 1AC.

Figure 8B:
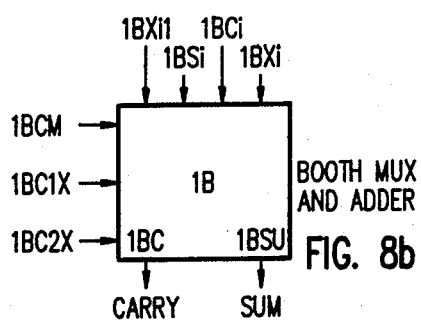
Figure 8C:
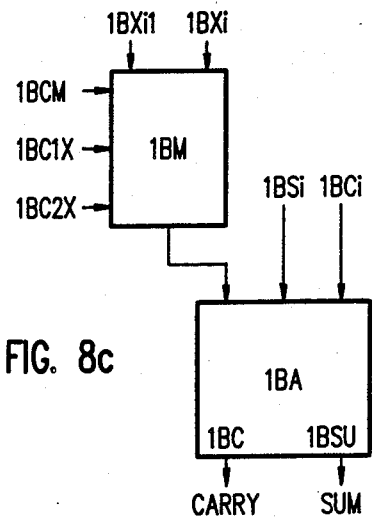

A block diagram of the Booth multiplexer and adder cell 1B is illustrated in FIG. 8b. The Booth multiplexer and adder cell 1B has a first input terminal 1BXil, a second input terminal 1BSi, and a third input terminal 1BCi, and a fourth input terminal 1BXi, three control line input terminals 1BCM, 1BC1X, 1BC2X and a first output terminal 1BC, and a second output terminal 1BSU. FIG. 8c illustrates a more detailed representation of the Booth multiplexer and adder cell 1B. The Booth multiplexer and adder cell 1B contains the Booth multiplexer 1BM, shown in FIG. 6, and the full adder 1BA as in FIG. 8a.

The first input terminal of the Booth multiplexer 1BM is the first input terminal 1BXil of the Booth multiplexer and adder cell 1B, while the second input terminal of the Booth multiplexer 1BM is the fourth input terminal 1BXi of the cell 1B. The control line input terminals of the multiplexer 1BM are the control line input terminals 1BCM, 1BC1X, 1BC2X of the cell 1B. The output terminal of the Booth multiplexer 1BM is connected to the first input terminal of the full adder 1BA. The second input terminal of the full adder 1BA is the second input terminal 1BSi of the cell 1B and the third input terminal 1BCi of the full adder is the third input terminal of the cell 1B. The carry output terminal of the full adder 1BA is the first output terminal. 1BC of the cell 1B and the sum output terminal of the adder 1BA is the second output terminal 1BSU.

The Booth multiplexer 1BM in FIG. 8c performs the modified Booth algorithm operation indicated by the signals applied to the control lines 1BCM, 1BC1X, 1BC2X on the input signals on the input terminals 1BXil, 1BXi of the multiplexer and passes a signal, as defined in Table II for each of the possible combinations of signals on the control lines, to the first input terminal of the full adder 1BA. This signal is summed with the signals on the terminals 1BCi, 1BSi and the resultant signals for the sum and carry are provided on the output terminals 1BSU, 1BC, respectively.

Figure 8D:
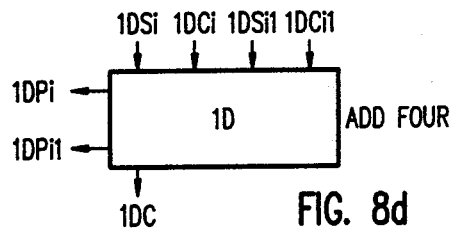

The full adder 1A in FIG. 8a provides the capability to add three input signals, but for certain terms in the partial modified Booth array, four terms must be added. A block diagram for the four term adder 1D is shown in FIG. 8d. This adder has a first input terminal 1DSi, a second input terminal 1DCi, a third input terminal 1DSil and a fourth input terminal 1DCil and a first output terminal 1DPi, a second output terminal 1DPil and a third output terminal 1DC.

Figure 8E:
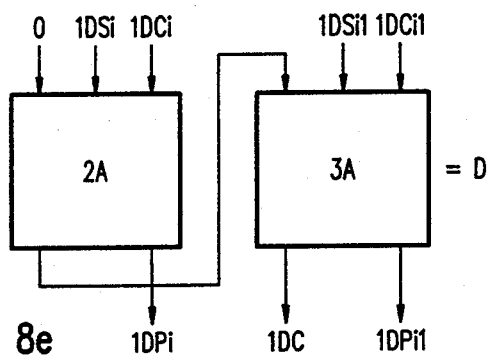

The function performed by the four term adder 1D is illustrated in more detail in FIG. 8e. Two full adders 2A, 3A are interconnected to make the four term adder 1D. The first input terminal for the full adder 2A is not used, while the second input terminal is the fist input terminal 1DSi for the four term adder 1D and the third is the second input terminal 1DCi for the four term adder 1D. The sum output terminal of the full adder 2A is the first output terminal 1DPi of the four term adder 1D. The carry output terminal from the full adder 2A is connected to a first input terminal of the full adder 3A, while the second input terminal of the full adder 3A is the third input terminal 1DSil of the four term adder 1D and the third input terminal is the fourth input terminal 1DCil of the four term adder 1D. The sum output terminal of the full adder 3A is the second output terminal 1DPil of the four term adder 1D and the carry output terminal of the full adder 3A is the third output terminal 1DC of the four term adder 1D.

Thus, the four term adder sums the signals on the first two input terminals 1DSi, 1DCi and provides the corresponding sum signal on the first output terminal 1DPi. If a carry signal is generated by this summation, it is provided as an input signal to the second full adder 3A. The second full adder then sums the carry signal propagated from the summation, of the signals on the first two input terminals 1DSi, 1DCi with the signals on the third and fourth input terminals 1DSil, 1DCil and provides the sum signal to the second output terminal, 1DPil and the carry signal to the third output terminal, 1DC.

Figure 8F:
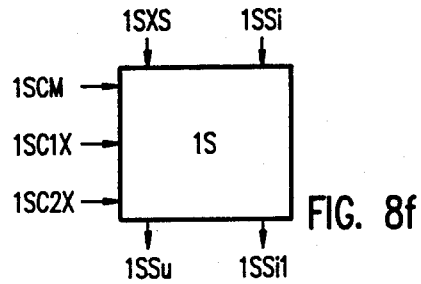
Figure 8G:
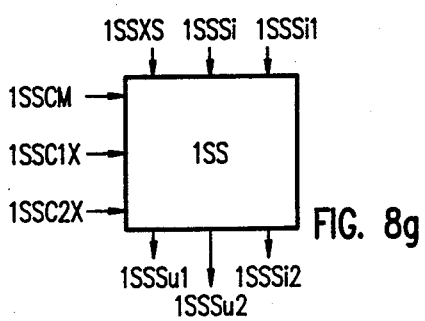
Figure 9:
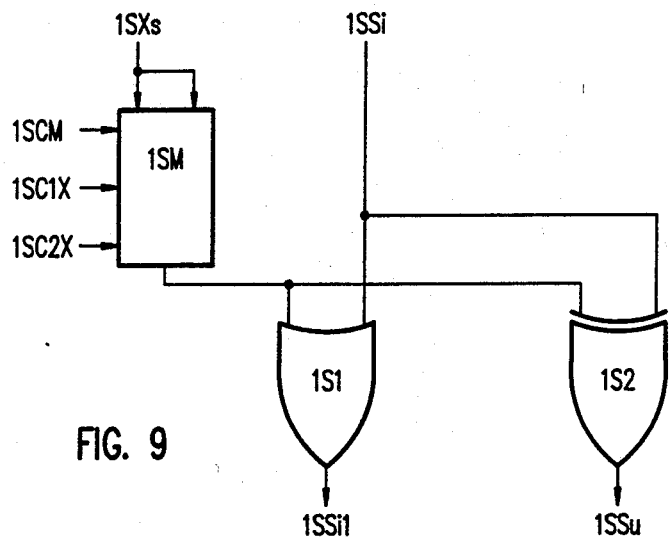
FIG. 9 is a schematic diagram of the sign extension cell in accordance with this invention.

In addition to the previous cell definitions, two additional cells are required for the implementation of the two's complement sign extension in the split array modified Booth multiplier. A block diagram of the sign extension cell 1S is illustrated in FIG. 8f and a block diagram of a special sign extension cell 1SS, required in the lower half of the split array, is illustrated in FIG. 8g. The sign extension cell 1S has a first input terminal 1SXs and a second input terminal 1SSi. The three Control line input terminals 1SCM, 1SC1X, 1SC2X, and a first output terminal 1SSU and a second output terminal 1SSil. The sign extension cell of FIG. 8f is shown in more detail in FIG. 9.

The sign extension cell 1S is compared of a Booth multiplexer 1SM, as shown in FIG. 6, interconnected with a logic circuit. The first input terminal 1SXs is connected to both of the input terminals of the Booth multiplexer 1SM. The sign extension cell control line input terminals 1SCM,, 1SC1X, 1SC2X are the control line input terminals of the Booth multiplexer 1SM. The output terminal of the Booth multiplexer 1SM is connected to a first input terminal of the OR gate 1S1 and to the first input terminal of the Exclusive OR gate 1S2. The second input terminal 1SSi of the cell 1S is connected to the second input terminal of the OR gate 1S1 and to the second input terminal of the Exclusive OR gate 1S. The output terminal of the Exclusive OR gate is the first output terminal 1SSu of the cell 1S, and the output terminal of the OR gate 1S1 is the second output terminal 1SSil of the cell 1S.

For two's complement operations the sign bit must be extended so as to complete the row of the multiplier array. The cell 1S, based upon the input signals and the signals on tee multiplexer control lines, provides the output signal required by the two's complement operation for padding the row in which the cell is contained.

The cell was designed based upon the possible combinations of the sign bit for two's complement addition from the row above the row containing the cell. The logic circuit of the cell selects the appropriate sign bit information for the row in which it is contained based upon the input signals to the circuit from the prior row.

Figure 10:
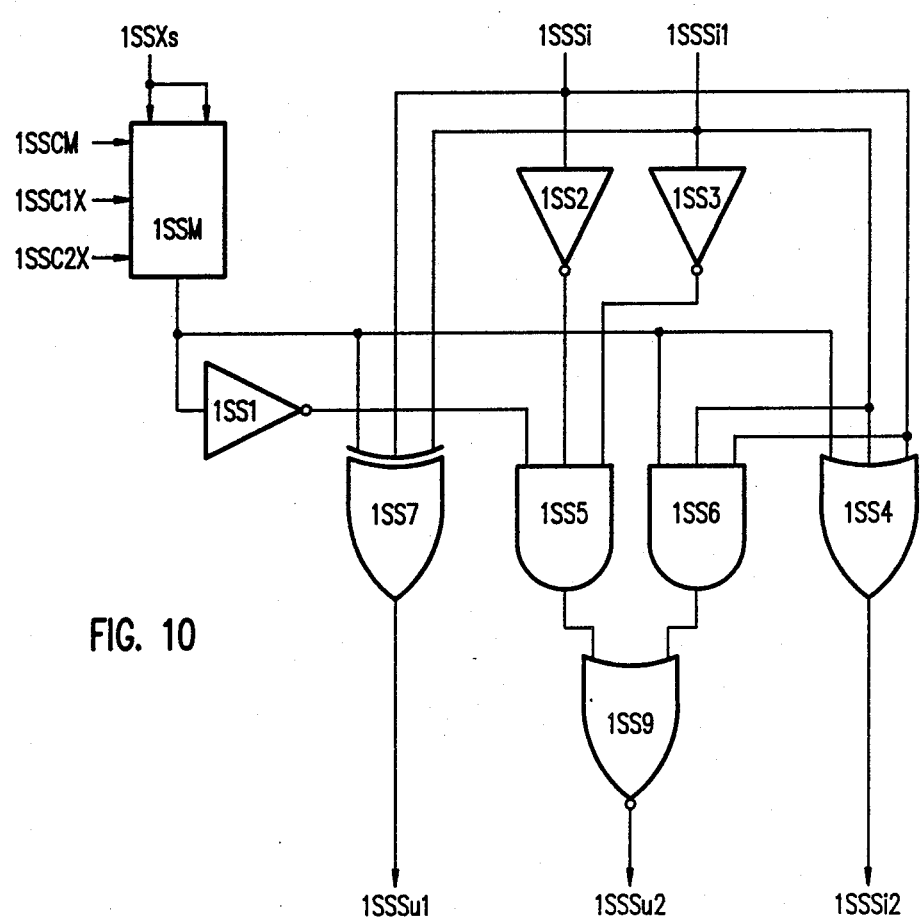
FIG. 10 is a schematic diagram of the special sign extension cell in accordance with this invention.

The last cell in FIG. 8g is the special sign extension cell 1SS. The cell 1SS has a first input terminal 1SSXs a second input terminal 1SSSi and a third input terminal 1SSSil. It has the three control line input terminals 1SSCM, 1SSC1X, 1SSC2X, a first output terminal 1SSSU1, a second output terminal 1SSSU2 and a third output terminal 1SSSi2. The actual implementation of the special sign extension cell 1SS is shown in FIG. 10.

The special sign extension cell 1SS is also comprised of a Booth multiplexer 1SSM, which is the same as the Booth multiplexer shown in FIG. 6, and a logic circuit. The first input terminal 1SSXs of the cell 1SS is connected to both of the input terminals of the Booth multiplexer 1SSM. The control line input terminals 1SSCM, 1SSC1X, 1SSC2X of the cell 1SS are the control line input terminals of the multiplexer 1SSM.

The output terminal of the Booth multiplexer 1SSM is connected to the input terminal of a first inverter 1SS1. The output terminal of the inverter 1SS1 is connected to the first input terminal of a first AND gate 1SS5. The output terminal of the Booth multiplexer 1SSM is also connected to the first input terminal of the Exclusive OR gate 1SS7, to the first input terminal of a second AND gate 1SS6, and to the first input terminal of a first OR gate 1SS4.

The second input terminal 1SSSi of the cell 1SS is connected to the input terminal of a second inverter 1SS2, to the third input terminal of the OR gate 1SS4, to the third input terminal of the AND gate 1SS6, and to the second input terminal of the Exclusive OR gate 1SS7. The output terminal of the inverter 1SS2 is connected to the second input terminal of the AND gate 1SS5.

The third input terminal 1SSSil of the cell 1SS is connected to the input terminal of a third inverter 1SS3, to the second input terminal of the OR gate 1SS4, to the second input terminal of the AND gate 1SS6, and to the third input terminal of the Exclusive OR gate 1SS7. The output terminal of the inverter 1SS3 is connected to the third input terminal of the AND gate 1SS5.

The output terminal of the Exclusive OR gate is the first output terminal 1SSSu 1 of the cell 1S. The output terminal of the AND gate 1SS5 is connected to a first input terminal of a second NOR gate 1SS9. To output terminal of the AND gate 1SS6 is connected to a second input terminal of the NOR gate 1SS9. The output terminal of the NOR gate 1SS9 is the second output terminal 1SSSu2 of the cell 1SS. The output terminal of the OR gate 1SS4 is the third output terminal 1SSSi2 of the cell 1SS.

The function of the special sign extension cell is to provide the proper two's complement padding for the three rows in the lower portion of the split array Booth multiplexer which requires three output terminals to describe the result. The operation is similar to that described for the sign extension cell except this cell must process the sign bit information from the two prior rows in the lower portion of the array and provide the proper sign extension for the row in which it is contained. Again, the cell was designed based upon the possible combinations of the sign bit for two's complement addition from the two rows above the row containing the cell. The logic circuit of the cell selects the appropriate sign bit information for the row in which it is contained based upon the input signals to the circuit from the prior two rows.

Figure 12B:
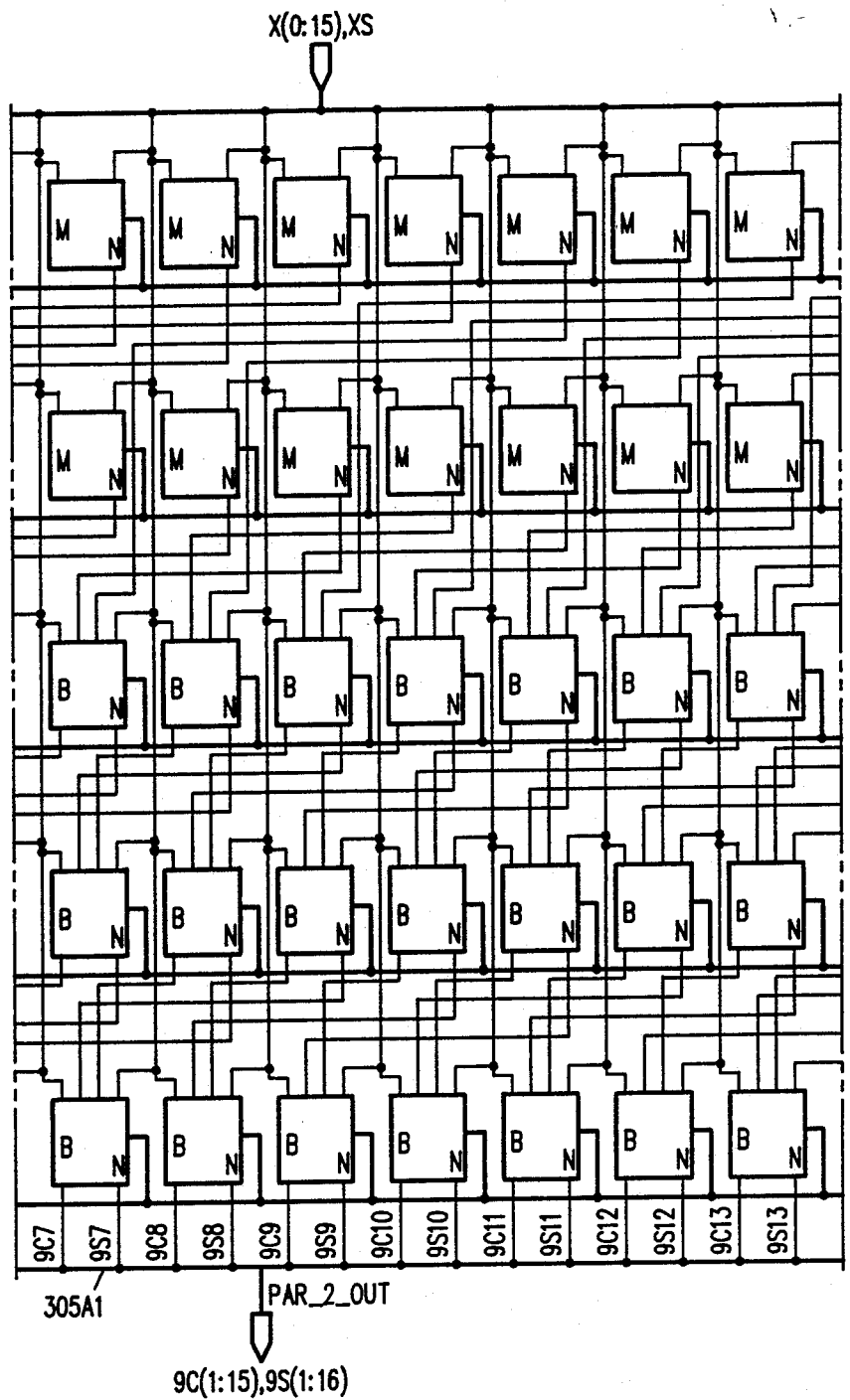
FIG. 12 is a schematic diagram of the lower portion of the split array modified Booth multiplexer in accordance with this invention.
Figure 12C:
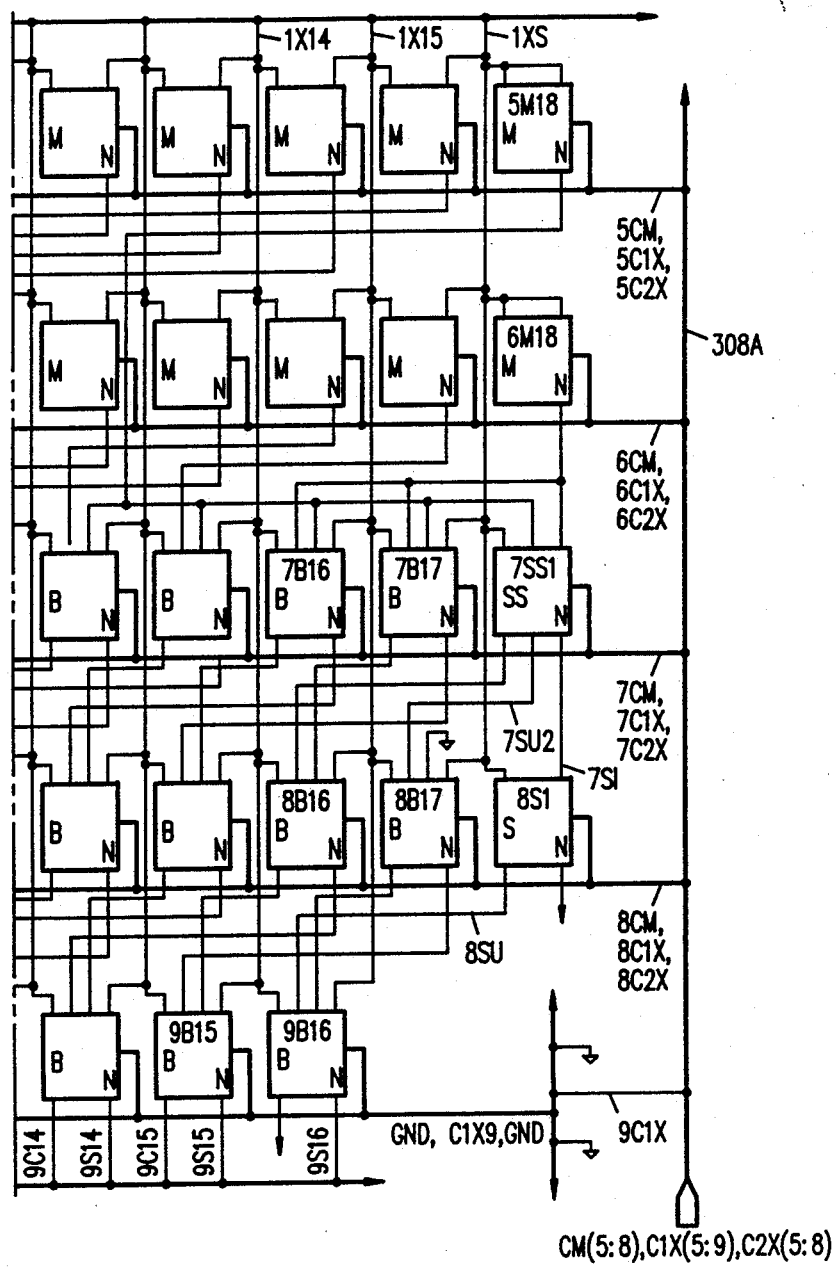
Figure 13:
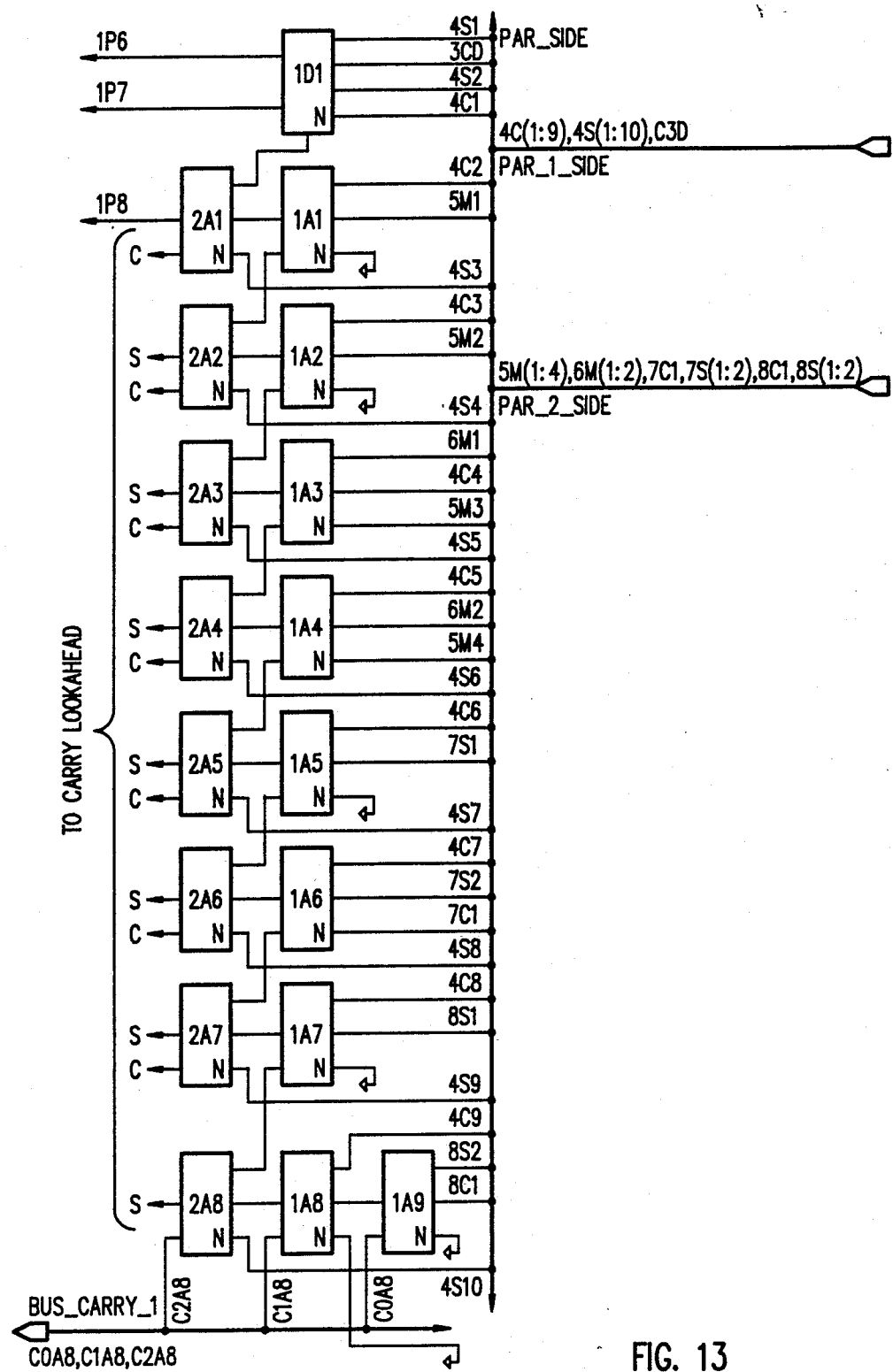
FIG. 13 is a schematic diagram of a first portion of the partial-product reduction adders in accordance with this invention.
Figure 14A:
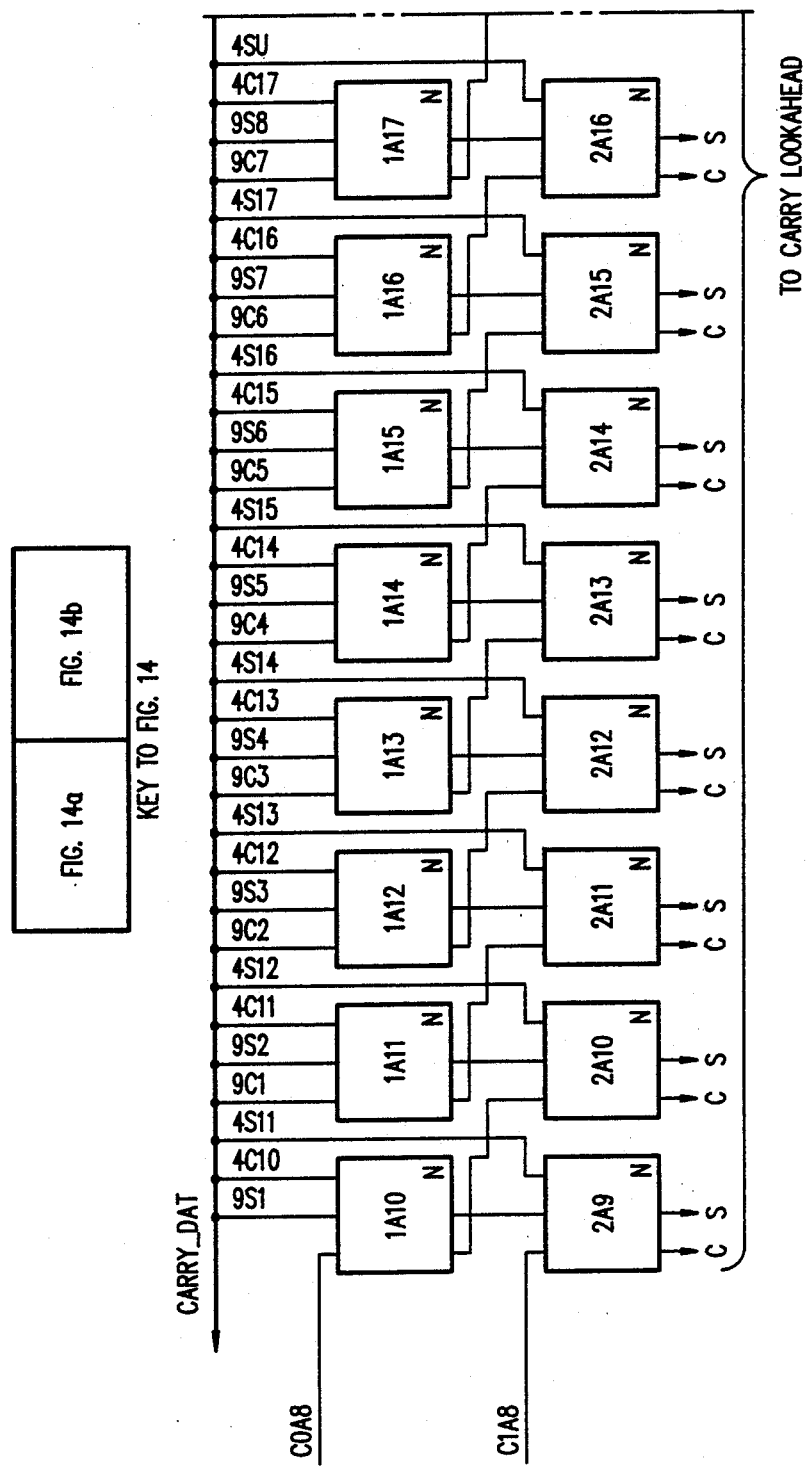
FIG. 14 is a schematic diagram of a second portion of the partial product reduction adders in accordance with this invention.
Figure 14B:
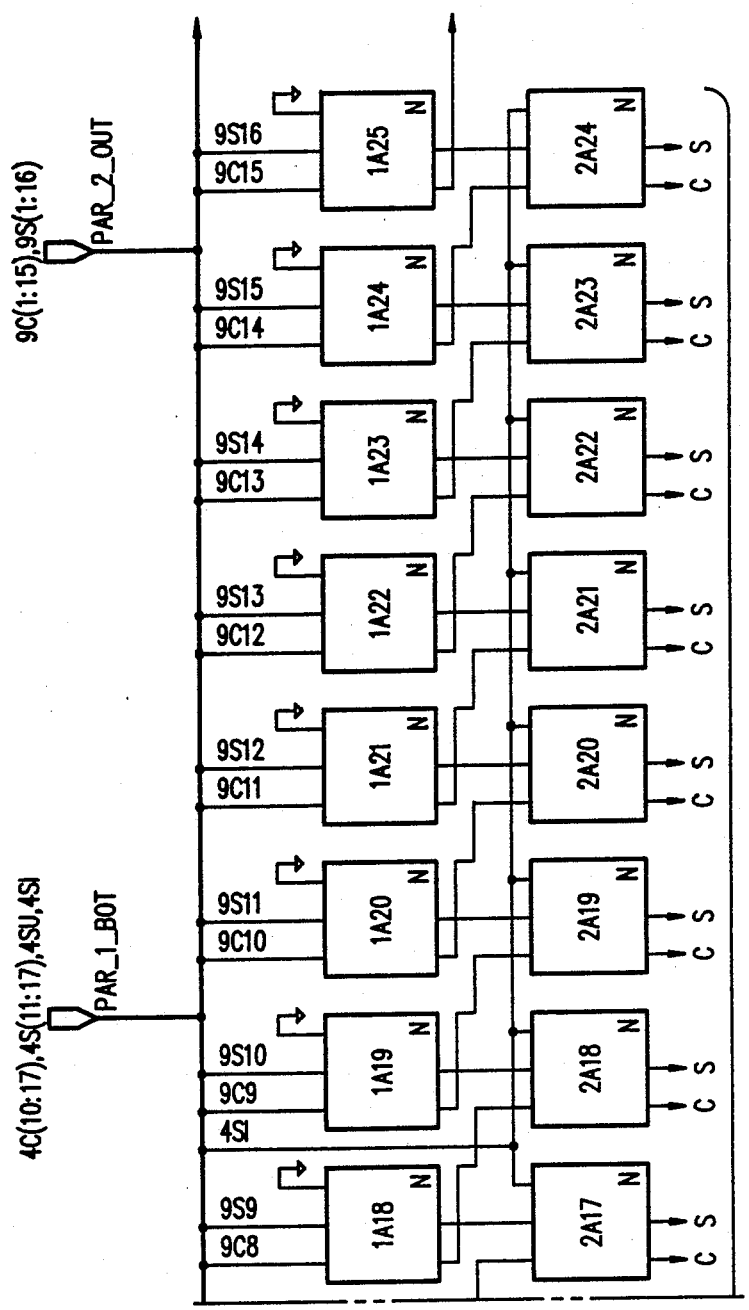

The cells in FIG. 8 have been used to build a 16×16 split array modified Both multiplier as illustrated in FIGS. 11, 12, 13 and 14. FIG. 11 illustrates the upper half of the array which corresponds to the partial modified Booth array 312 in FIG. 4, while FIG. 12 shows the lower half of the modified Booth array which corresponds to the partial modified Booth array 313 in FIG. 4. FIGS. 13 and 14 illustrates the partial product reduction adders 314 in FIG. 4.

As previously described, the upper partial modified Booth array 312 in FIG. 4 is comprised of one row of multiplexers and n/4−1 rows of Booth multiplexer and full adder cells, where n is the number of bits in the multiplier. Therefore, for the 16×16 multiplier array there are three rows of Booth multiplexer and full adder cells in the upper partial modified Booth array.

Thus, the upper partial modified Booth array is comprised of four rows, a first row of Booth multiplexers, as illustrated in FIG. 6, a second, third and fourth row of Booth multiplexer and full adder cells, as illustrated in FIG. 8b.

The lower partial modified Booth array is comprised of two rows of multiplexers and n/4−1 rows of Booth multiplexer and full adder cells, or again three rows of Booth multiplexer and full adder cells. Thus, the fifth and six rows of the total array (the first and second rows of the lower partial modified Booth array) are comprised of Booth multiplexers and the seventh, eighth and ninth rows of the total array (the third, forth and fifth rows of the lower partial modified Booth array) are comprised of Booth multiplexers and full adder cells.

The physical implementation for the split array modified Booth multiplier in FIGS. 11 and 12 illustrates the advantages of this invention over other high speed skip a row multipliers. The configuration is uniform and easily placed in a compact rectangular array without the necessity for long lines interconnecting the various cells in the array. Further, the reduction in adder delays over the prior art modified Booth array is illustrated. For the upper half of the total array there are three full adder delays associated with the second, third and fourth rows while there are three adder delays associated with the seven, eight and ninth rows in the lower half of the total array. However, since both parts of the array function simultaneously, i.e., increased parallelism, the total adder delay time associated with operation of the array is three adder delays plus one Booth multiplexer delay. The three adder delays and the one Booth multiplexer delay plus the two adder delays of the partial product reduction adders give a total of only five adder delays plus one Booth multiplexer delay for the split array modified Booth multiplier of both signed and unsigned multiplication. The prior art modified Booth multiplier has a total eight adder delays for a 16×16 multiplier. Therefore, the multiplier of this invention is significantly faster than the prior art multipliers.

In FIG. 11, the first row of the array is comprised of eighteen multiplexers 1M1-1M18 of the type shown in FIG. 6. In the second row, there are seventeen Booth multiplexer and adder cells 2B1-2B17 of the type shown in FIG. 8b. In addition, after the Booth multiplexer and adder cells 2B1-2B17 in the second row is the sign extension cell 2S1. The third and fourth rows each have seventeen Booth multiplexer and adder cells 3B1-3B17, 4B1-4B17, and at the end of each row is a sign extension cell, the cell 3S1 in the third row and the cell 4S1 in the fourth row.

The line 307 from the Booth multiplex decoder 310 to the partial modified Booth array 312 in FIG. 4 is the same as the line 307A in FIG. 11. The line 307A contains four sets of three lines each as was described in the discussion of the Booth multiplex decoder illustrated in FIG. 7. The first set of three lines 1CM, 1C1X, 1C2X in the line 307A is connected to the control line terminals of each Booth multiplexer in the first row of Booth multiplexer cells 1M1-1M18. The second set of three lines 2CM, 2C1X, 2C2X in the line 307A is connected to the control line terminals of each Booth multiplexer in the Booth multiplexer and adder cells 2B1-217 in the second row and to the control line terminals of the Booth multiplexer in the sign extension cell 2S1. The third set of lines 3CM, 3C1X, 3C2X and the fourth set of lines 4CM, 4C1X, 4C2X, are connected in the same manner to the third row 3B1-3B17, 3S1 and fourth row 4B1-4B17, 4S1 of Booth multiplexer and adder cells and sign extension cell, respectively.

The line 1X is connected to ground and therefore carries a signal equivalent to a logical zero. The line 1X is also connected to the first input terminal of the multiplexer cell 1M1, and to the first input terminal of the Booth multiplexer and adder cells 2B1, 3B1, 4B1. The line 1X0 is connected t the second input terminal of the multiplexer cell 1M1, to the first input terminal of the multiplexer cell 1M2, to the fourth input terminal of the Booth multiplexer and adder cells 2B1, 3B1, 4B1, and to the first input terminal of the Booth multiplexer and adder cells 2B2, 3B2, 4B2. The line 1X1 is connected to the second input terminal of the multiplexer cell 1M2, to the first input terminal of the multiplexer cell 1M3, to the fourth input terminal of the Booth multiplexer and adder cells 2B2, 3B2, 4B2, and to the first input terminal of the Booth multiplexer and adder cells 2B3, 3B3, 4B3. The remaining lines 1X2-1X15 are connected to the respective Booth multiplexer and adder cells in a manner similar to that described for lines 1X0 and 1X1.

The line 1XS is connected to the second input terminal of the multiplexer cell 1M17, to the first and second input terminals of the multiplexer cell 1M18, to the fourth input terminal of the Booth multiplexer and adder cells 2B17, 3B17 4B17, and to the first input terminal of the sign extension cells 2S1, 3S1 and 4S1.

The line 1S1 connects the output terminal of the multiplexer cell 1M1 to the first input terminal of the four term adder cell 2D1. The line 1S2 connects the output terminal of the multiplexer cell 1M2 to the third input terminal of the four term adder cell 2D1.

The line 1CM from the Booth multiplex decoder is connected to the second input terminal of four term adder cell 2D1. The fourth input terminal of the four term adder cell 2D1 is grounded, which effectively applies a logical zero to the input. The line 1S3 connects the output terminal of the multiplexer cell 1M3 to the second input terminal of the Booth multiplexer and adder cell 2B1. The line 1S4 connects the output terminal of the multiplexer cell 1M4 to the second input terminal of the Booth multiplexer and adder cell 2B2.

The output terminal of each of the multiplexer cells 1M5-1M17 is connected to the appropriate second input terminal of one of the Booth multiplexer and adder cells 2B3-2B15 in a manner similar to that for the lines 1S3, 1S4. The output terminal of the multiplexer cell 1M18 is connected to the second input terminal of the Booth multiplexer and adder cell 2B16, to the second input terminal of the Booth multiplexer and adder cell 2B17, and to the second input terminal of the sign extension cell 2S1.

The line 2CM from the Booth multiplex decoder is connected to the third input terminal of the Booth multiplexer and adder cell 2B1. Similarly, the line 3CM is connected to the third input terminal of the Booth multiplexer and adder cell 2B3; the line 4CM is connected to the third input terminal of the Booth multiplexer and adder cell 2B5; the line 5CM is connected to the third input terminal of the Booth multiplexer and adder cell 2B7; the line 6CM is connected to the third input terminal of the Booth multiplexer and adder cell 2B9; the line 7CM is connected to the third input terminal of the Booth multiplexer and adder cell 2B11; and the line 8CM is connected to the third input terminal of the Booth multiplexer and adder cell 2B13. The third input terminal of the Booth multiplexer and adder cells 2B2, 2B4, 2B6, 2B8, 2B10, 2B12, 2B14, 2B15, 2B16 and 2B17 is grounded.

The first output terminal of the four term adder 2D1 is connected to the line 1P0, while the second output terminal of the four term adder cell 2D1 is connected to the line 1P1. The third output terminal of the four term adder cell 2D1 is connected to the second input terminal of the four term adder cell 3D1 by the line 2CD.

The first output terminal of the Booth multiplexer and adder cell 2B1 is connected to he fourth input terminal of the four term adder cell 3D1 by the line 2C1. The second output terminal of the Booth multiplexer and adder cell 2B1 is connected to the first input terminal of the four term adder cell 3D1 by the line 2S1. The third input terminal of the four term adder cell 3D1 is connected to the second output terminal of the Booth multiplexer and adder cell 2B2 by the line 2S2, and the first output terminal of the Booth multiplexer and adder cell 2B2 is connected to the third input terminal of the Booth multiplexer and adder cell 3B1.

The first output terminal of the Booth multiplexer and adder cell 2B3 is connected to the third input terminal of the Booth multiplexer and adder cell 3B2 by the line 2C3, and the second output terminal of the Booth multiplexer and adder cell 2B3 is connected to the second input terminal of the Booth multiplexer and adder cell 3B1. The first and second output terminals from the Booth multiplexer and adder cells 2B4-2B17 are connected to the respective second and third input terminals of the Booth multiplexer and adder cells 3B2-3B16 in the third row of the array in a manner similar to that described for the Booth multiplexer and adder cell 2B3. That is, for the i th cell in the second row, the first output terminal is connected to the third input terminal of the −1 cell in the third row while the second output terminal of the i cell is connected to the second input terminal of the i−2 cell in the third row.

The first output terminal of the sign extension cell 2S1 is connected to the second input terminal of the Booth multiplexer and adder cell 3B16 by the line 2SU. The second output terminal of the sign extension cell 2S1 is connected to the second input terminal of the Booth multiplexer and adder cell 3B17 and also to the second input terminal of the sign extension cell 3I1. The third input terminal of the Booth multiplexer and adder cell 3B17 is grounded.

The input terminals of the Booth multiplexer and adder cell 4B1-4B17, the sign extension cell 4S1, and the four term adder cell 4D1 are connected to the output terminals of the four term adder cell 3D1, the Booth multiplexer and adder cells 3B1-3B17 and the sign extension cell 3S1 in the third row in a fashion that is identical to the connections between the output terminals of the second row and the input terminals of the third row.

The first output terminal of the cell 4B1 is connected to the line 4C1, the first output terminal of the Booth multiplexer and adder cell 4B2 is connected to the line 4C2 and the first output terminal of each of the Booth multiplexer and adder cells 4B3-4B17 is connected to a similarly-named line as shown in FIG. 11. The second output terminal of the cells 4B1-4B17 are connected to the lines 4S1-4S17 respectively. The first output terminal of the sign extension cell 4S1 is connected to the line 4SU, while the second output terminal cf the sign extension cell 4S1 is connected to the line 4SI.

The third output terminal of the four term adder 4D1 is connected to the line 3CD. All the output lines from the fourth row of the array form a bus 304A which is equivalent to the line 304 in FIG. 4. The first output terminal of the four term adder 3D1 is connected to the line 1P2, and the second output terminal is connected to the line 1P3. The first output terminal of the four term adder 4D1 is connected to the line 1P4 and the second output terminal is connected to the line 1P5.

The lower half of the split array modified Booth multiplier is shown in FIG. 12. As explained previously, if the number of bits in the multiplier is greater than an 8 bit unsigned binary number then the lower partial modified Booth array has two rows of multiplexers and n/4−1 rows of Booth multiplexer and full adder cells. Thus, for a 16-bit split modified Booth array multiplier, there are two rows of multiplexers and three rows of Booth multiplexer and full adder cells in the lower portion of the split array modified Booth multiplier.

In FIG. 12, the first row of Booth multiplexer cells 5M1-5M18 in the lower portion of the array comprises the fifth row of the total array and the second row of Booth multiplexer cells 6M1-6M18 comprises the sixth row of the total array. Each of multiplexer cells in these rows is equivalent to that shown in FIG. 6. The first row of Booth multiplexer and adder cells 7B1-7B17 in the lower array is the seventh row of the total array. In the seventh row immediately after the Booth multiplexer and adder cell 7B17 is the special sign extension cell 7SS1.

The second row of Booth multiplexer and adder cells B1-8B17 in the lower array is the eighth row of the total array. In the eighth row, immediately after the Booth multiplexer and adder cell 8B17 is the sign extension cell S1. The ninth row of, the total array is comprised of the third row of Booth multiplexer and adder cells 9B1-9B16 in the lower array.

The lines 1X, 1X0-1X15, 1XS are connected to the multiplexer cells, the Booth multiplexer and adder cells and the sign extension cells in the lower half of the array in a fashion identical to that in which they were attached to the respective cells in the upper half of the split array modified Booth multiplier. Also, the line 308A in FIG. 11, which is the same as the lie 308 in FIG. 4, comprises the four sets of three control lines plus the line 9CIX as shown in FIG. 7. Each set of three control lines is connected to the control line input terminals of each cell in the appropriate row. The three control lines to the control line input terminals of the cells in the ninth row are the line 9C1X in the line 308A, plus the two lines 9CM, 9C2X which are grounded, and thus carry the equivalent of a logic zero signal.

The interconnection scheme between the multiplexer cells and the Booth multiplexer and adder cells in FIG. 12 is repetitive in nature. Therefore, only the interconnections which are not repetitive and a sample of the repetitive interconnections will be described. The line 5S1 is connected to the output terminal of the multiplexer cell 5M1; the line 5S2 is connected to the output terminal of the multiplexer cell 5M2; and the lines 5S3 and 5S4 are connected similarly to the multiplexer cells 5M3, 5M4. The lines 5S1–5S4 form part of the bus 305A2 which goes to the partial product reduction adders of this invention.

The line 5S5 connects the output terminal of the multiplexer cell 5M5 to the third input terminal of the Booth multiplexer and adder cell 7B1. The output terminals of the multiplexer cells 5M6–5M17 are similarly connected to the third input terminal of the Booth multiplexers and adder cells 7B2–7B13 respectively. That is, the output terminal of the i th multiplexer cell in the fifth row, where i=6,7, ... 17, is connected to the third input terminal of the i−4 cell in the seventh row. The output terminal of the Booth multiplexer cell 5M18 is connected to the third input terminal of the Booth multiplexer and adder cells 7B14–7B17, and to the second input terminal of the special sign extension cell 7SS1.

The line 6S1 is connected to the output terminal of the multiplexer cell 6M1 and the line 6S2 is connected to the output terminal of the multiplexer 6M2. The lines 6S1 and 6S2 form part of the bus 305A2. The line 6S3 connects the output terminal of the multiplexer cell 6M3 to the second input terminal of the Booth multiplexer and adder cell 7B1. The lines 6S3–6S17 connect the respective output terminal of the Booth multiplexer cells 6M3–6M17 to the appropriate second input terminal of the Booth multiplexer and adder cells 7B2–7B15. That is, the output terminal of the i th multiplexer cell in the sixth row where i=3,4 ... 17 is connected to the second input terminal of the i−2 cell in the seventh row. The output terminal of the multiplexer cell 6M18 is connected to the second input terminal of the Booth multiplexer and adder cells 7B16, 7B17 and to the third input terminal of the special sign extension cell 7SS1.

The line 7C1 is connected to the first output terminal of the Booth multiplexer and adder cell 7B1. The line 7S1 is connected to the second output terminal of the Booth multiplexer and adder cell 7B1. The line 7S2 is connected to the second output terminal of the Booth multiplexer and adder cell 7B2. The lines 7C1, 7S1, 7S2 form part of the bus 305A2.

The line 7C2 connects the first output terminal from the Booth multiplexer and adder cell 7B2 to the third input terminal of the Booth multiplexer and adder cell 8B1. The first output terminal for the Booth multiplexer and adder cells 7B3–7B17 and the third input terminals of the Booth multiplexers and adder cells 8B2–8B16 are interconnected such that the first output terminal of the i th Booth multiplexer and adder cell in the seventh row, where i=3, 4, ... 17, is connected to the third input terminal of the i−1 Booth multiplexer and adder cell in the eighth row. The second output terminal of the i th Booth multiplexer and adder cell in the seventh row, where i=3, 4, ... 17, is connected to the second input terminal of the i−2 Booth multiplexer and adder cell in the eighth row.

The line 7SU1 connects the first output terminal of the special sign extension cell 7SS1 to the second input terminal of the Booth multiplexer and adder cell BB16. The line 7SU2 connects the second output terminal of the special sign extension cells 7SS1 to the second input terminal of the Booth multiplexer and adder cell 8B17. The third input terminal of the Booth multiplexer and adder cell 8B17 is connected to ground. The line 7S1 connects the third output terminal of the special sign extension cell 7SS1 to the second input in terminal of the sign extension cell 8S1.

The interconnections between the output terminals of the Booth multiplexer and adder cells 8B1–8B17 in the eighth row and the input terminals of the Booth multiplexer and adder cells 9B1–B16 are the same as the interconnections between the output terminals of the Booth multiplexer and adder cells 7B1–7B17 and the input terminals of the Booth multiplexer and adder cells 8B1–8B16. The line 8SU connects the first output terminal of the sign extension cell 8S1 to the second input terminal of the Booth multiplexer and adder cell 9B16. The second output terminal of the sign extension cell 8S1 is not used.

The line 9C1 is connected to the first output terminal of the Booth multiplexer and adder cell 9B1, add the line 9S1 is connected to the second output terminal. Each of the Booth multiplexer and adder cells 9B2–9B16 have similar lines connected to the output terminals as shown in FIG. 12, except the first output terminal of the Booth multiplexer and adder cell 9B16 is not used. The output lines from the ninth row form tee bus 305A1. The buses 305A2 and 305A1 in FIG. 12 are the same as the line 305 in FIG. 4.

As shown in FIG. 4, the lines 304 and 305 are the input lines to the partial product reduction adders 314 which comprises two rows of full adders. The actual configuration of the partial product reduction adders for the 16×16 split array modified Booth multiplier is shown in FIGS. 13 and 14.

The first row is comprised of the full adder cells 1A1–1A25 and the second row is comprised of the full adders 2A1–2A24. The lines 4S1, 3CD, 4S2 and 4C1 are connected to the input terminals of the four term adder cell 1D1. The line P6 is connected to the first output terminal of the four term adder 1D1, and the line P7 is connected to the second output terminal. The remaining output lines from the upper half of the split array and the lower half of the split array are connected to the full adder cells 1A1–1A25, 2A1–2A24 as shown in FIGS. 13 and 14. The line numbers used in FIGS. 11 and 12 are the same as the line numbers in FIGS. 13 and 14.

The output terminals from the second row of adders 2A1–2A24 are connected to a circuit which adds the signals together to determine the bits of the final product just as in the prior art modified Booth array multipliers.

To use the circuit as described in FIGS. 11, 12, 13 and 14 along with the Booth multiplex decoder in FIG. 7, signals representing the bits of the multiplicand are supplied to the lines 1X0–1X15. The sign bit signal is applied to the line 1XS. The least significant bit of the multiplicand is supplied on the lines 1X0 and the most significant bit is supplied on the lines 1X15. The signals corresponding to the bits of the multiplier are supplied to the Booth multiplex decoder which then provides the appropriate signals on the output lines as described in conjunction with FIG. 7. The signals on the control lines pass to the appropriate multiplexers and in conjunction with the signals on the lines 1X0–1X15, 1XS the desired modified Booth multiplication is performed in the split array. The signals which are applied on the control lines 1CM–8CM are injected into the array, as described above, to form the appropriate two's complement number for the negative operations in the modified Booth algorithm.

The output lines 1P0–1P8 provide the least significant bits of the product of the multiplicand and the multiplier. The remaining bits of the product are formed using a carry look ahead addition scheme to provide high-speed combination of the output signals from the split array. To understand the basic formation of the final product bits, the carry term from the adder to 2A1 is added to the sum term of the adder 2A2 to form the ninth bit of the product and the carry term from this addition is combined with the carry term from the adder 2A2 and the sum term of the adder 2A3 to form the tenth bit of the product term and so forth. This combination of outputs is similar to that which would be performed for the standard modified Booth array multiplier and therefore should introduce no additional delay times over that encountered in the prior art multipliers using the modified Booth's algorithm.

To further demonstrate the operation of the split array modified Booth multiplier, a simple example will be described. Consider the binary multiplication:

$$1000000000000$$
$$\times\ \ 100000000000$$

The first step in the multiplication is to supply the signal corresponding to the bits of the multiplier to the Booth multiplex decoder. For the above multiplication, the signals on the input lines to the decoder are:

| 0 | $Y_0$ | $Y_1$ | $Y_2$ | $Y_3$ | $Y_4$ | $Y_5$ | $Y_6$ | $Y_7$ | $Y_8$ | $Y_9$ | $Y_{10}$ | $Y_{11}$ | $Y_{12}$ | $Y_{13}$ | $Y_{14}$ | $Y_{15}$ | $Y_5$ | $Y_S$ |
|---|---|---|---|---|---|---|---|---|---|---|---|---|---|---|---|---|---|---|
| 0 | 0 | 0 | 0 | 0 | 0 | 0 | 0 | 0 | 0 | 0 | 0 | 0 | 1 | 0 | 0 | 0 | 0 | 0 |

The decoder forms the nine sets of bit segments shown in the second column of Table III. Using the information for the various combinations of bit segments in Table II, the signal shown in the columns CM, C1X, C2X of Table III are applied to the output lines from the decoder. The signals on the control lines to the array are all zero, except for its signal on the line 7C1X which is a one.

TABLE III

DEMONSTRATION OF THE OPERATION OF THE BOOTH MULTIPLEX DECODER

| Output Line Group | Bit Segments | CM | C1X | C2X | Booth Operator |
|---|---|---|---|---|---|
| 1 | 0, 0, 0 | 0 | 0 | 0 | 0 |
| 2 | 0, 0, 0 | 0 | 0 | 0 | 0 |
| 3 | 0, 0, 0 | 0 | 0 | 0 | 0 |
| 4 | 0, 0, 0 | 0 | 0 | 0 | 0 |
| 5 | 0, 0, 0 | 0 | 0 | 0 | 0 |
| 6 | 0, 0, 0 | 0 | 0 | 0 | 0 |
| 7 | 0, 1, 0 | 0 | 1 | 0 | +X |
| 8 | 0, 0, 0 | 0 | 0 | 0 | 0 |
| 9 | 0, 0, 0 | 0 | 0 | 0 | 0 |

The signals on the lines 1X, 1X0–1X15, 1XS are shown below:

| Line: | 1X | 1X0 | 1X1 | 1X2 | 1X3 | 1X4 | 1X5 | 1X6 | 1X7 | 1X8 |
|---|---|---|---|---|---|---|---|---|---|---|
| Signal: | 0 | 0 | 0 | 0 | 0 | 0 | 0 | 0 | 0 | 0 |
| Line: | 1X9 | 1X10 | 1X11 | 1X12 | 1X13 | 1X14 | 1X15 | 1XS | | |
| Signal: | 0 | 0 | 0 | 0 | 1 | 0 | 0 | 0 | | |

From Table II, when the control line signals are all zeros, the Booth multiplexer output signal is zero. Therefore, the output signals from the first row, the fifth row, and the sixth row, in the array are all zeros, because these rows are comprised of Booth multiplexer cells and as shown in Table III, the signals on the controls to these rows are all zero. Similarly, the output signals from the multiplexers in the Booth multiplexer and adder cells in the second through fourth rows are all zero because the signals on the control lines to the multiplexers are all zero as shown in Table III. Therefore, the input signals to the adders in the Booth multiplexer and adder cells in the second through fourth rows are all zeros. Consequently, the signals to the partial product reduction adders from the upper half of the split array modified Booth multiplier are all zeros.

While the upper half of the split array is generating all zeros, the lower half is simultaneously processing the signals on the control lines and the multiplicand input lines 1X, 1X0–1X15, 1XS. As noted above, the output signals from the fifth an sixth rows, which are supplied to the second and third input terminals of the cells in the seventh row, are all zeros.

However, as shown in Table III, the control lines to the seventh row of the array have a one signal on the line 7C1X. Therefore, from Table II and FIG. 8b, the signal on the fourth input terminal of each Booth multiplexer and adder cell in the seventh row will be passed through the Booth multiplexer to the input terminal of the adder in the cell. The signal on the fourth input terminal of the cells in the seventh row are all zero, except the signal on the fourth terminal of the cell 7B14.

Thus, the input signals to all the adders in the cells in the seventh row are all zeros except the input signals to the adder in the cell 7B14 from the multiplexer in that cell which is a one. The output signal on the second output terminal of the cell 7B14 is consequently a one.

The multiplexer control line signals to the eight and ninth rows of the array are also all zeros, as shown in Table III, and so the output signal from the multiplexers in these rows is zero. Similarly, the signals on the second and third terminals of all the cells in row eight are zero, except the signal on the second input terminal of cell 8B12 which is a one because it is connected to the second output terminal of the cell 7B14.

The signal on the second output terminal of the cell 8B12 is also a one. The signals on the second and third terminals of all the cells in the ninth row are all zero, except the signal on the second input terminal of the cell 9B10, which is a one, because it is connected to the second output terminal of the cell 8B12. Consequently, the signal on the line 9S10 is a one and the signals on all other output lines from the lower half of the split array modified Booth multiplier are zero.

The line 9S10 is connected to the second input terminal of the full adder cell 1A19 as shown in FIG. 13. Since all the other signals to the partial product reduction adders are zero, the one signal on line 9S10 is passed through the full adder 1A19 to the full adder 2A18 and to the output line from the full adder 2A18 labeled "S". All other signals on the lines labeled "S" and "C", which indicates whether the line has a sum or carry signal, in FIG. 13 and 14 are zero. Thus, the twenty-fifth bit of the product will be a one and all other bits a zero which is the correct result.

While the above process could be followed to test all the permutations and combinations possible in the $16 \times 16$ split array multiplier, it is not practical. The novel feature of this invention, the splitting of the array and then recombining the partial products in the partial product reduction adders, is a novel way to sum the partial products and does not alter the basic modified Booth algorithm. Therefore, the results from the split array are fully equivalent to the prior art full array and they have been achieved with fewer adder delays. However, to fully test this novel approach to modified Booth multiplication, the $16 \times 16$ split array modified Booth multiplier was studied in detail by computer simulation.

To simulate the array the cells in the fifth row were modeled as Booth multiplexers and all the other cells were modeled as Booth multiplexer and adder cells. However, the cells in the first and sixth rows had the second and third input terminals and the first output terminal grounded so that the cells functioned simply as Booth multiplexers. The results of the simulation, shown in Attachment 1, demonstrated that the array as shown in FIGS. 11, 12, 13, and 14 functioned correctly.

Finally, the array was constructed and tested. The results demonstrated the correct operation of the array, the enhanced performance of the array, and the layout advantages of the split array architecture. Thus, the split array architecture of this invention provides enhanced performance for high speed multiplication, a total operational delay time of $n+1$ adder delays plus one Booth multiplexer delay, while preserving the features of uniformity of layout and the availability of the $n/2$ least significant bits of the product.

We claim:

1. A system for digital unsigned and signed modified Booth binary multiplication of a multiplicand and a n bit multiplier, n being equal to or greater than the number of bits in an 8 bit unsigned binary number, and said multiplier consisting of $n_1$ least significant bits and $n_2$ most significant bits, comprising:
   a first source of signals representing said multiplicand;
   a second source of signals representing said multiplier;
   a first array, operatively connected to said first and second source of signals, for generating a first multiplicity of partial product signals resulting from the modified Booth multiplication of said multiplicand and said $n_1$ least significant bits of said multiplier by said first array;
   wherein said first array is comprised of n/4 rows and further wherein:
   a first row of said first array is comprised of multiplexer cells;
   a second row through an n/4 rows are each comprised of cells wherein each cell comprises a multiplexer and a full adder; and
   means for operatively interconnecting said cells in said first array so that said first array generates said first multiplicity of partial product signals;
   a second array, operatively connected to said first and second sources of signals, for generating a second multiplicity of partial product signals resulting from the modified Booth multiplication of said multiplicand and said $n_2$ most significant bits of said multiplier by said second array; wherein:
   said second array is comprised of n/4+1 rows and further wherein:
   a first row and a second row of said second array are comprised of multiplexer cells;
   a third row through a n/4+1 row of said second array are each comprised of cells wherein each cell comprises a multiplexer and a full adder;
   means for operatively interconnecting said cells in said second array so that said second array generates said second multiplicity of partial product signals; and
   said first array and second array each simultaneously and independently generate said first and second multiplicities of partial product signals, respectively.

2. A system for digital unsigned and signed modified Booth binary multiplication of a multiplicand and a n bit multiplier as in claim 1 wherein:
   said cells in said first array are arranged in parallel rows in a first direction and said cells in said rows of said first array form parallel columns in a second direction perpendicular to said first direction; and
   said cells in said second array are arranged in parallel rows in a first direction and said cells in said rows of said second array form parallel columns in a second direction perpendicular to said first direction.

3. A system for digital unsigned and signed modified Booth binary multiplication of a multiplicand and a n bit multiplier as in claim 1 having an operational delay time of less than n/2 full adder delays.

4. A system for digital unsigned and signed modified Booth binary multiplication of a multiplicand and an n bit multiplier as in claim 1 wherein:
   said first row and said second row of said second array each generate a two's complement sign bit signal; and
   said third row of said second array further comprises means, operatively connected to said first row and said second row of said second array, for summing two's complement sign bit signals to provide sign extension signals for said third row of said second array.

5. A system for digital unsigned and signed modified Booth binary multiplication of a multiplicand and a n bit multiplier as in claim 1, the product of the multiplication having m bits and said system further comprising:
    means, operatively connected to said first array, for generating the n/2 least significant bits of the product of said multiplication.

6. A system for digital signed and unsigned modified Booth binary multiplication of a multiplicand and a n bit multiplier as in claim 5, said system further comprising:
    addition means, operatively connected to said first and second arrays, to receive said first and second multiplicity of partial product signals, and generate a multiplicity of sum signals and carry signals.

7. A system for digital unsigned and signed modified Booth binary multiplication of a multiplicand and a n bit multiplier as in claim 5 wherein said means for generating said n/2 least significant bits of the product of said multiplication comprises:
    a multiplicity of four term adders, operatively connected to said first array, each four term adder, in response to partial product signals from said first array, providing at least one bit of said n/2 least significant bits of said product of said multiplication.

8. A system for digital unsigned and signed modified Booth binary multiplication of a multiplicand and a n bit multiplier, n being less than the number of bits in an 8 bit unsigned binary number, and said multiplier consisting of n1 least significant bits and $n_2$ most significant bits, comprising:
    a first source of signals representing said multiplicand;
    a second source of signals representing said multiplier;
    a first array, operatively connected to said first and second source of signals, for generating a first multiplicity of partial product signals resulting from the modified Booth multiplication of said multiplicand and said $n_1$ least significant bits of said multiplier by said first array;
    wherein said first array is comprised of n/4 rows and further wherein:
        a first row of said first array is comprised of multiplexer cells;
        a second row through a n/4 row are each comprised of cells wherein each cell comprises a multiplexer and a full adder; and
        means for operatively interconnecting said cells in said first array so that said first array generates said first multiplicity of partial product signals;
    a second array, operatively connected to said first and second sources of signals, for generating a second multiplicity of partial product signals resulting from the modified Booth multiplication of said multiplicand and said $n_2$ most significant bits of said multiplier by said second array;
    wherein:
    said second array is comprised of n/4+1 rows and further wherein;
        a first row of said second array is comprised of multiplexer cells; and
        a second row through a n/4+1 row of said second array are each comprised of cells wherein each cell comprises a multiplexer and a full adder; and
        means for operatively interconnecting said cells in said second array so that said second array generates said second multiplicity of partial product signals; and said first array and second array each simultaneously and independently generate said first and second multiplicity of partial product signals, respectively.

9. A system for digital unsigned and signed modified Booth binary multiplication of a multiplicand and a n bit multiplier as in claim 8 wherein:
    said cells in said first array are arranged in parallel rows in a first direction and said cells in said rows of said first array form parallel columns in a second direction perpendicular to said first direction; and
    said cells in said second array are arranged in parallel rows in a first direction and said cells in said rows of said second array form parallel columns in a second direction perpendicular to said first direction.

10. A system for digital unsigned and signed modified Booth binary multiplication of a multiplicand and a n bit multiplier as in claim 8, the product of the multiplication having m bits and said system further comprising:
    means, operatively connected to said first array, for generating the n/2 least significant bits of the product of said multiplication.

11. A system for digital unsigned and signed modified Booth binary multiplication of a multiplicand and a n bit multiplier as in claim 10, said system further comprising:
    addition means, operatively connected to said first and second arrays, to receive said first and second multiplicity of partial product signals, and generate a multiplicity of sum signals and carry signals.

12. A system for digital unsigned and signed modified Booth binary multiplication of a multiplicand and a n bit multiplier as in claim 10 wherein said means for generating said n/2 least significant bits of the product of said multiplication comprises:
    a multiplicity of four term adders, operatively connected to said first array, each four term adder, in response to partial product signals from said first array, providing at least one bit of said n/2 least significant bits of said product of said multiplication.

13. A system for digital unsigned and signed modified Booth binary multiplication of a multiplicand and a n bit multiplier consisting of $n_1$ least significant bits and $n_2$ most significant bits, the product of the multiplication having m bits comprising:
    a first source of signals representing said multiplicand;
    a second source of signals representing said multiplier;
    a first array, operatively connected to said first and second source of signals, for generating a first multiplicity of partial product signals resulting from the modified Booth multiplication of said multiplicand and said $n_1$ least significant bits of said multiplier by sad first array;
    a second array, operatively connected to said first and second sources of signals, for generating a second multiplicity of partial product signals resulting from the modified Booth multiplication of said multiplicand and said $n_2$ most significant bits of said multiplier by said second array; and
    means, operatively connected to said first array, for generating the n/2 least significant bits of the product of said multiplication wherein:
    said first array and second array each simultaneously and independently generate said first and second multiplicities of partial product signals, respectively.

14. A system for digital unsigned and signed modified Booth binary multiplication of a multiplicand and a n bit multiplier as in claim 13, said system further comprising:
   addition means, operatively connected to said first and second arrays, to receive said first and second multiplicity of partial product signals, and generate a multiplicity of sum signals and carry signals.

15. A system for digital unsigned and signed modified Booth binary multiplication of a multiplicand and a n bit multiplier as in claim 13 wherein said means for generating said n/2 least significant bits of the product of said multiplication comprises:
   a multiplicity of four term adders, operatively connected to said first array, each four term adder, in response to partial product signals from said first array, providing at least one bit of said n/2 least significant bits of said product of said multiplication.

16. A system for digital unsigned and signed modified Booth binary multiplication of a multiplicand and an n bit multiplier consisting of $n_1$ least significant bits and $n_2$ most significant bits wherein n is equal to or greater than the number of bits in an 8 bit unsigned binary number and the product of said multiplication having m bits comprising:
   a first source of signals representing said multiplicand;
   a second source of signals representing said multiplier;
   a first array, operatively coupled to said first source of signals and to said second source of signals, for generating a first multiplicity of partial product signals consisting of the modified Booth multiplication of said multiplicand add the $n_1$ least significant bits of said multiplier, said first array including:
   a first row of multiplexer cells;
   a second row through a n/4 row of cells, each cell comprising a multiplexer and a pull adder; and
   means for operatively interconnecting said cells so that said first array generates a first multiplicity of partial product signals;
   a second array, operatively connected to said first source of signals and to said second source of signals, for generating a second multiplicity of partial product signals consisting of the modified Booth multiplication of said multiplicand and the $n_2$ most significant bits of said multiplier, said second array including:
   a first row and second row having multiplexer cells;
   a third row through a n/4+1 rowcells, each cell comprising a multiplexer and a full adder; and
   means for operatively interconnecting said cells so that said second array generates a second multiplicity of partial product signals;
   a multiplicity of four term adders, operatively connected to said first array, each four term adder, in response to partial product signals from said first array, providing at least one bit of the n/2 least significant bits of said product of said multiplication; and
   a multiplicity of full adders, operatively connected to said first and second arrays, to receive said first and second multiplicity of partial product signals and generate a multiplicity of sum and carry signals.

17. A system for digital unsigned and signed modified Booth binary multiplication of a multiplicand and an n bit multiplier consisting of n1 least significant bits and n2 most significant bits, wherein n is less than the number of bits in an 8 bit unsigned binary number and the product of said multiplication having m bits, comprising:
   a first source of signals representing said multiplicand;
   a second source of signals representing said multiplier;
   a first array, operatively coupled to said first source of signals and to said second source of signals, for generating a first multiplicity of partial product signals consisting of the modified Booth multiplication of said multiplicand and the $n_1$ least significant bits of said multiplier, said first array including:
   a first row of multiplexer cells;
   a second row through a n/4 row cells, each cell comprising a multiplexer and a full adder; and
   means for operatively interconnecting said cells so that said first array generates said first multiplicity of partial product signals;
   a second array, operatively connected to said first source of signals an to said second source of signals, for generating a second multiplicity of partial product signals consisting of the modified Booth multiplication of said multiplicand and the $n_2$ most significant bits of said multiplier, said second array including:
   a first row of multiplexer cells;
   a second row through a n/4+1 row of cells, each cell comprising a multiplexer and a full adder; and
   means for operatively interconnecting said cells so that said second array generates said second multiplicity of partial product signals;
   a multiplicity of four term adders, operatively connected to said first array, each four term adder, in response to partial product signals from said first array, providing at least one bit of the n/2 least significant bits of said product of said product of said multiplication; and
   a multiplicity of full adders, operatively connected to said first and second arrays, to receive said first and second multiplicities of partial product signals, and generate a multiplicity of sum and carry signals.

* * * * *